US012388785B2

(12) United States Patent
Wagener et al.

(10) Patent No.: US 12,388,785 B2
(45) Date of Patent: Aug. 12, 2025

(54) USER SENTIMENT ANALYSIS FOR URL REPUTATIONS

(71) Applicant: McAfee, LLC, San Jose, CA (US)

(72) Inventors: John Wagener, West Lakeland, MN (US); Joanna Negrete, Brentwood, CA (US)

(73) Assignee: McAfee, LLC, San Jose, CA (US)

( * ) Notice: Subject to any disclaimer, the term of this patent is extended or adjusted under 35 U.S.C. 154(b) by 295 days.

(21) Appl. No.: 17/491,209

(22) Filed: Sep. 30, 2021

(65) Prior Publication Data

US 2023/0106639 A1 Apr. 6, 2023

(51) Int. Cl.

*H04L 29/06* (2006.01)
*G06F 40/40* (2020.01)
*G06N 3/04* (2023.01)
*H04L 9/40* (2022.01)

(52) U.S. Cl.

CPC .......... *H04L 63/0236* (2013.01); *G06F 40/40* (2020.01); *G06N 3/04* (2013.01); *H04L 63/1483* (2013.01)

(58) Field of Classification Search

None

See application file for complete search history.

(56) References Cited

U.S. PATENT DOCUMENTS

2005/0289520 A1* 12/2005 Overall .................. G06F 21/14 717/137
2016/0328401 A1* 11/2016 Dhawan ............. G06F 16/9535
2021/0006592 A1* 1/2021 Heyman ............. H04L 63/1483
2021/0334466 A1* 10/2021 Campos Ortega ...... G06F 40/30
2022/0358529 A1* 11/2022 Rawat ............... G06Q 30/0203

* cited by examiner

*Primary Examiner* — Sanchit K Sarker
(74) *Attorney, Agent, or Firm* — Patent Capital Group

(57) ABSTRACT

A computing apparatus includes a hardware platform comprising a processor and a memory; and instructions encoded within the memory to receive a user-generated comment related to a uniform resource locator (URL); analyze the comment with a trained machine learning (ML) model to determine a user sentiment for the comment; assign a predicted reputation to the URL according to the user sentiment; and use the predicted reputation as an input to an analysis of the URL.

19 Claims, 13 Drawing Sheets

500
START
504 CUSTOMER REQUEST SUBMITTED
508 FEATURE GENERATION
512 GENERATE SENTIMENT PREDICTION
516 ABUSE PREVENTION
518 CONSISTENT W/ COLLECTIVE SENTIMENT
524 IGNORE SENTIMENT
520 INCORPORATE AS INPUT FEATURE
528 EXTRACT STANDARD URL FEATURES
536 FINAL REPUTATION
590 DONE

USER SENTIMENT ANALYSIS FOR URL REPUTATIONS

FIELD OF THE SPECIFICATION

This application relates in general to computer security, and more particularly though not exclusively to a system and method for providing user sentiment analysis for URL reputations.

BACKGROUND

Uniform resource locators (URLs) are addresses that are used to identify resources on the internet, such as websites. Some URLs point to resources that are malicious or deceptive.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elem220ents may be rearranged in different configurations, and elements shown in one block may, in appropriate circumstances, be moved to a different block or configuration.

SUMMARY

Figure 1:
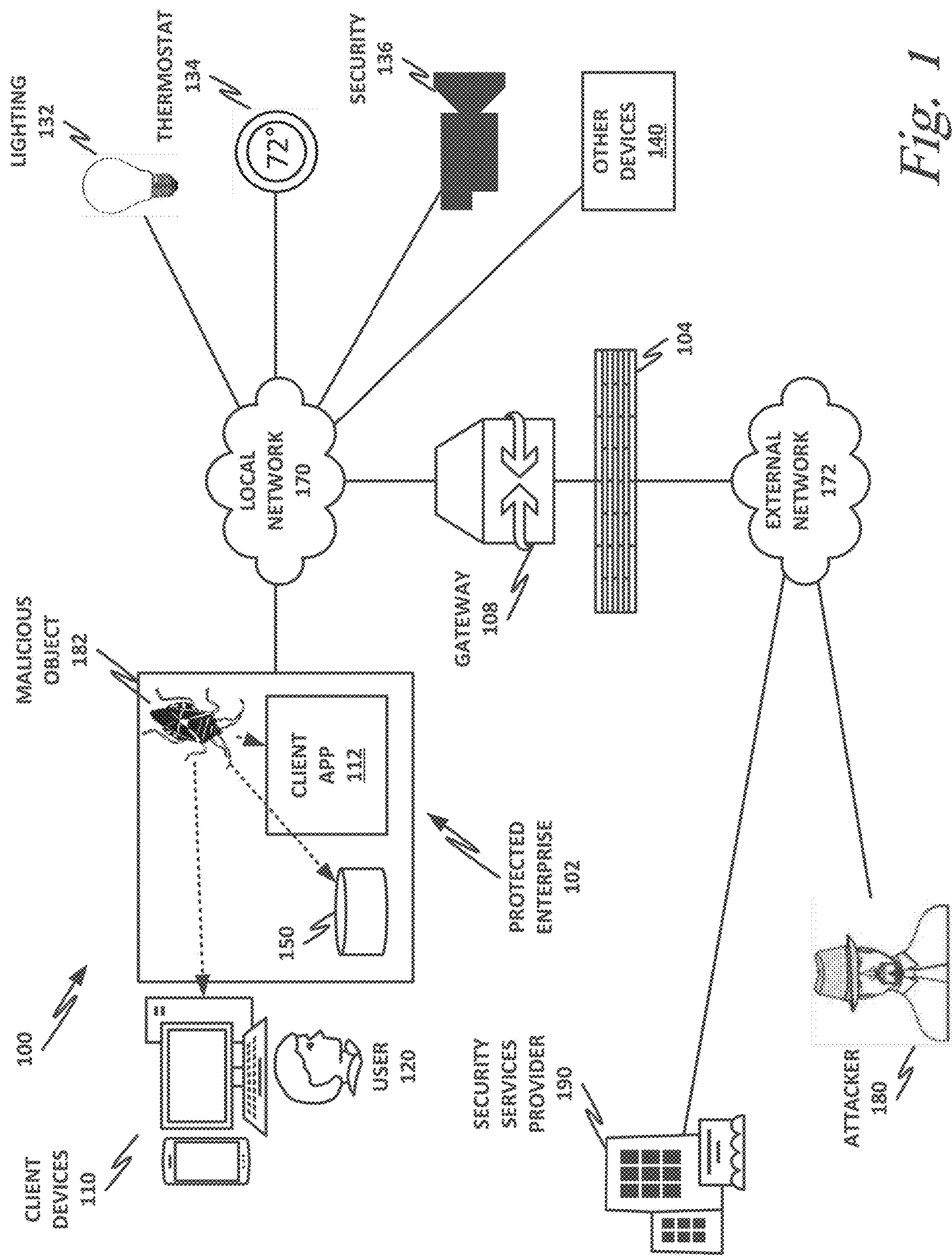
FIG. 1 is a block diagram of selected elements of a security ecosystem.

A computing apparatus includes a hardware platform comprising a processor and a memory; and instructions encoded within the memory to receive a user-generated comment related to a uniform resource locator (URL); analyze the comment with a trained machine learning (ML) model to determine a user sentiment for the comment; assign a predicted reputation to the URL according to the user sentiment; and use the predicted reputation as an input to an analysis of the URL.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Security services providers such as McAfee Inc. and others may have comprehensive security and protection solutions for their clients and users. One component of a comprehensive protective suite may include a URL reputation service. Such a URL reputation service could also be a standalone product.

For example, McAfee Inc. provides the global threat intelligence (GTI) service. GTI is a cloud-based service that maintains a master database of URL reputations, including reputations for legitimacy and security. For example, GTI can be used to advise a user of a website's category (such as gaming, business, news, social media, or similar) and whether a site is determined to be a phishing or other malicious website.

Such a reputation system may make decisions on millions of URLs every day. Furthermore, a website's reputation may change in response to risk factors such as malware infection. Once a site has become infected, a web reputation may be changed in response. For example, if the site was previously listed as "green" or "benign," the reputation may be changed to "red" or "malicious" or "phishing" once an attack has occurred. However, this change in reputation may be temporary. When the site's owners have removed the malicious content from the site, the site may no longer pose a security risk. The reputation may then be reverted to low risk or green again.

Re-examination of a site may be triggered in some cases by a customer's request. For example, a customer may submit a request and provide a human-readable comment about the request. This request may be to reanalyze a site or change a site's reputation based on information available to the user or customer. In an illustrative example, a security researcher reads the user's comment and factors that comment into the final determination of whether to allow or disallow a site. Note that the comment may not necessarily be dispositive of allowing or disallowing the site but may be one factor in a multifactor analysis that is considered.

In some cases, a security services vendor may receive a large number of requests in a short time, such as many requests in a single day. This can result in delays in processing requests because the processing may require manual effort. Providing prompt review across all available time zones may require maintaining round-the-clock staff to address customer complaints and feedback. Existing URL analysis systems, including deep learning and ML systems, may account for many factors that can be featurized but may not account for user comments.

Embodiments of the present specification provide a ML engine, such as a deep learning or convolutional neural network (CNN) that can be used to augment other analysis factors or to otherwise provide inputs to the system. For example, an ML system may be configured to provide natural language processing (NLP) that can analyze a user submitted comment for sentiment (e.g. whether the user is requesting that the site be green-lighted or red-lighted), strength of sentiment, a collective sentiment (if multiple user comments are directed to the same URL), and other factors. The ML-derived user sentiment can then be used as an input or as one feature among a number of features available for a URL analysis system. The user comment can also be used for other purposes, such as to prioritize analysis in an analysis queue or to initiate reanalysis of a site that was previously analyzed and that currently has a reputation believed to be reliable.

User comments may come in various different forms. For example, a customer may complain about a URL reputation being high-risk, resulting in restricted access to the site. On the other hand, a user may believe a site to be malicious and complain that the site is not blocked. A web reputation system may be designed to respond quickly, such as by reassessing a site and adjusting the reputation according to the risk. An accurate web reputation can directly affect internet traffic to a website or completely block access to some services offered by a domain. This can impact revenue generated by the site, and so it is valuable to correct a reputation as quickly as possible, especially in the case where the reputation has legitimately changed.

Customers can also submit URLs that may require the web reputation to be adjusted to high-risk. For example, such websites may surface during events like a new phishing campaign. Some attacks may be localized to a geographical region or a specific company, which could be a customer of a security services provider. These types of URLs are typically rare and may not be publicly available from other threat intelligence sources. Receiving customer requests about the lack of high-risk coverage along with comments on emerging threats allows these to be factored into as additional information into a final determination of a reputation for a website. Advantageously, all customers of the security services provider may then be protected from URLs that pose a security risk.

In some cases, multiple customer comments may create a scenario where a website receives contradicting suggestions. It is advantageous to provide a mechanism to perform a quality check that allows the removal of a site from an automated workflow and assigns it for human review in a case where a reliable determination cannot be made. This allows for the computation of a collective sentiment for a URL and helps to keep accuracy for the final web reputation score.

In an illustrative embodiment, the computation of a collective reputation can also guard against misuse or abuse of the comment system. For example, a campaign against a website for ideological or competitive reasons may include "spamming" the security services provider with requests to mark the website as malicious. In some cases, incoming requests can be compared to an existing collective reputation to determine whether the incoming requests deviate from a collective sentiment within a number of standard deviations. The collective sentiment, as determined by a number of incoming user messages, can also be compared to other analysis factors. If the collective sentiment varies greatly from the analysis according to other factors, then this may be a clue that the system is being abused. In that case, appropriate corrective action can be taken.

In other cases, multiple user comments may come in with a similar and credible user sentiment. In the case that an outlier exists—such as a single comment with a sentiment that differs from the collective sentiment by a number of standard deviations—then the one comment may be determined to be rogue. In that case, the rogue comment may not be considered in a later URL analysis.

Advantages are realized by providing a system that adjusts web reputation scores in real-time or near real-time. This realizes advantages over systems that require human intervention for every user comment and associated decision. Such human intervention may introduce a delay that can vary from a few minutes to a few days, depending on the volume of requests and staffing. Furthermore, multiple customers presenting conflicting comments can further complicate the decision-making process.

The system disclosed herein uses NLP techniques and artificial intelligence (AI)-based sentiment analysis to alleviate some of these issues. NLP can be used to predict whether a customer's request is suggesting a low or high-risk reputation for a website, and the strength of the user's sentiment. The prediction score from a sentiment analysis may then provide a feature input to a web reputation assessment score, which itself may also be based on an ML model. The predicted reputation score from the user comment or suggestion may be a feature that is considered by that ML engine.

This reduces the manual effort required by human users and thus helps to increase the speed and efficiency of reviews. Web reputation scores can thereby be enhanced with a predicted reputation or score from a customer's sentiment analysis. This improves the accuracy of the automated system. When multiple customer requirements are provided for a single URL, these can be used to compute a collective sentiment for the URL. The collective sentiment can be used to detect conflicts in customer requests and avoid toggling during automation. The avoidance of toggling or jitter in the reputation can help to improve the customer experience.

In principle, the ML system of the present specification includes evaluating customer sentiment to determine if the customer is suggesting that the website is clean or dirty. This can also include assigning a strength to the sentiment, including preserving capitalization and punctuation. This system also computes a collective sentiment score for the URL in the case that multiple comments are provided. In some embodiments, the system factors in the strength of the sentiment analysis into the final reputation score. For example, a user that is more adamant about a reputation may receive additional weight (assuming the user is also credible). Finally, the system may score the site for security risks. This can include using the sentiment and/or strength of sentiment as an input to a model that scores the website.

This system provides an analysis that determines whether the site is malicious or clean from the user's perspective. This may not necessarily be determinative of the final reputation, but the sentiment and strength of sentiment may be an input to the overall web reputation score. The use of collective sentiment scores for multiple customer submissions may also help prevent conflicting reputation results.

Advantageously, this system can process high volumes of customer complaints, feedback, or other comments in a short time, such as in a matter of seconds instead of a matter of hours or days. It also provides a reliable assessment that can later be verified through the final reputation score. The customer sentiment may be used not only to identify whether the website is submitted is clean or malicious, but the final score can also be used to reflect the emotion of the customer and the strength of the disagreement or sentiment.

This solution enhances the final web reputation algorithm with the score from the sentiment model. Such a solution can improve customer satisfaction by taking swift action on web reputation reassessment. In some cases, the user may quickly be notified that the website has been analyzed, including accounting for the user's sentiment and strength of sentiment. This can help to satisfy customers while also improving the quality of reputation analysis. The use of collective sentiments can provide a safeguard that prevents automating requests when a site receives contradictory comments. Collective sentiments can also help to improve protection for all customers against zero-day phishing or zero-day malware campaigns.

A result is an enhanced URL reputation ecosystem that incorporates the predicted score from the sentiment model as a new feature to the web reputation algorithm. Collective sentiment provides a means to automatically detect conflicting customer comments and, in cases of conflict, to ignore input from a sentiment model in the final algorithm if it is deemed to be unreliable. This can also significantly reduce the manual effort involved in processing customer submissions. Furthermore, this system can significantly reduce the costs associated with processing customer submissions. Furthermore, it can significantly reduce the amount of time needed to review a customer submission. Further advantageously, this system provides predetermination of the reputation for a URL. It may also provide zero-day protection against malicious campaigns and significantly improve customer experience and satisfaction. It can also significantly improve the quality of decisions. Further advantageously, this system provides a mechanism to stop automation toggling of the reputation of websites that receive contradictory reviews.

The foregoing can be used to build or embody several example implementations, according to the teachings of the present specification. Some example implementations are included here as nonlimiting illustrations of these teachings.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computing apparatus. The computing apparatus also includes a hardware platform may include a processor and a memory. The apparatus also includes instructions encoded within the memory to: receive a user-generated comment related to a URL, analyze the comment with a trained ML model to determine a user sentiment for the comment, assign a predicted reputation to the URL according to the user sentiment, and use the predicted reputation as an input to an analysis of the URL. Other embodiments of this aspect include corresponding computer systems, apparatus, and computer programs recorded on one or more computer storage devices, each configured to perform the actions of the methods.

Implementations may include one or more of the following features. The computing apparatus where the analysis of the URL is an analysis to determine whether the URL hosts a phishing website. The instructions are further to adjust a reputation of the URL according to the predicted reputation score. The instructions are further to block or unblock access to the URL according to the predicted reputation. The instructions are further to queue the URL for additional analysis according to the predicted reputation. The instructions are further to promote the URL's priority in an analysis queue according to the predicted reputation. The instructions are further to train the ML model from a set of user-generated comments with known sentiments. The instructions are further to train the ML model from a set of URLs with known reputations. Assigning the predicted reputation may include accounting for a reputation for reliability of a user that is associated with the comment. The ML model is a CNN. The instructions are further to vectorize the comment by applying a term frequency-inverse document frequency (TF-IDF) vectorizer. Vectorizing the comment may include parsing the comment into equal length vectors. The instructions are further to assign a sentiment strength to the comment. The instructions are further to provide the sentiment strength as a feature input to the URL analysis. The instructions are to preserve capitalization and punctuation of the comment. The instructions are further to assign a collective sentiment score to a plurality of comments related to the URL. The instructions are to ignore the user sentiment if the user sentiment deviates from the collective sentiment beyond a threshold. The threshold is a selected number of standard deviations. Implementations of the described techniques may include hardware, a method or process, or computer software on a computer-accessible medium.

One general aspect includes one or more tangible. The non-transitory computer-readable storage media also includes receive a new user comment that requests an adjustment to a reputation for a URL. The media also includes analyze the comment within a NLP engine that applies AI to the NLP. The media also includes assign a sentiment score to the user comment. The media also includes according to a result of analyzing the comment and the sentiment score, assign a predicted reputation to the URL. Other embodiments of this aspect include corresponding computer systems, apparatus, and computer programs recorded on one or more computer storage devices, each configured to perform the actions of the methods.

Implementations may include one or more of the following features. The one or more tangible, non-transitory computer-readable media where the instructions are further to perform a URL analysis of content of the URL to assign a reputation to the URL. The instructions are further to assign a sentiment strength to the comment. The instructions are further to provide the sentiment strength as a feature input to the URL analysis. The instructions are further to adjust a reputation of the URL according to the predicted reputation score. The instructions are further to block or unblock access to the URL according to the predicted reputation. The instructions are further to queue the URL for additional analysis according to the predicted reputation. The instructions are further to promote the URL's priority in an analysis queue according to the predicted reputation. The instructions are further to train the NLP engine from a set of user-generated comments with known sentiments. The instructions are further to train the NLP engine from a set of URLs with known reputations. Assigning the predicted reputation may include accounting for a reputation for reliability of a user that is associated with the comment. The instructions are to preserve capitalization and punctuation of the comment. The instructions are further to assign a collective sentiment score to a plurality of comments related to the URL. The instructions are to ignore the user sentiment if the user sentiment deviates from the collective sentiment beyond a threshold. The threshold is a selected number of standard deviations. The NLP engine may include a CNN. The instructions are further to vectorize the comment by applying a term frequency-inverse document frequency (TF-IDF) vectorizer. Vectorizing the comment may include parsing the comment into equal length vectors. Implementations of the described techniques may include hardware, a method or process, or computer software on a computer-accessible medium.

One general aspect includes a computer-implemented method. The computer-implemented method also includes training a ML model to assign sentiment ratings to human comments. The method also includes receiving a novel human comment requesting review of a URL reputation or reclassification of the URL. The method also includes analyzing the novel human comment with the ML model. The method also includes assigning a sentiment score to the human comment. The method also includes using the sentiment score as an input to an ML security analysis of the URL. Other embodiments of this aspect include corresponding computer systems, apparatus, and computer programs recorded on one or more computer storage devices, each configured to perform the actions of the methods.

Implementations may include one or more of the following features. The method where the security analysis of the URL is an analysis to determine whether the URL hosts a phishing website. The method of any 47, may include adjusting a reputation of the URL according to sentiment score. An apparatus may include means for performing the method. The means for performing the method may include a processor and a memory. The memory may include machine-readable instructions that, when executed, cause the apparatus to perform the method. The apparatus is a computing system. At least one computer-readable medium may include instructions that, when executed, implement a method or realize an apparatus. The method may include blocking or unblock access to the URL according to the sentiment score. The method may include queueing the URL for additional analysis according to the sentiment score. The method may include promoting the URL's priority in an analysis queue according to the sentiment score. The method may include training the ML model from a set of user-generated comments with known sentiments. The method may include training the ML model from a set of URLs with known reputations. The ML model is a CNN. The method may include vectorizing the comment by applying a term frequency-inverse document frequency (TF-IDF) vectorizer. Vectorizing the comment may include parsing the comment into equal length vectors. The method may include assigning a sentiment strength to the comment. The method may include providing the sentiment strength as a feature input to the URL analysis. The method may include preserving capitalization and punctuation of the comment. The method may include assigning a collective sentiment score to a plurality of comments related to the URL. The method may include ignoring the sentiment score if the sentiment score deviates from the collective sentiment beyond a threshold. The threshold is a selected number of standard deviations. Assigning the sentiment score may include accounting for a reputation for reliability of a user that is associated with the comment. Implementations of the described techniques may include hardware, a method or process, or computer software on a computer-accessible medium.

A system and method for user sentiment analysis for URL reputations will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or NFV, gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the GTI™ database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Because of the various threats illustrated in FIG. 1, it may be advantageous to provide a comprehensive security ecosystem that helps protect users against the threats illustrated. This may include as one component a cloud-based URL reputation service operated by security services provider 190. For example, McAfee Inc. provides the GTI service that provides multifactor reputations for URLs that users may encounter. In some cases, users may submit comments, complaints, or other feedback that request changes to the reputations of various URLs. In those cases, it may be beneficial for a cloud-based security services system providing a URL reputation service to incorporate these comments into its model.

Figure 2:
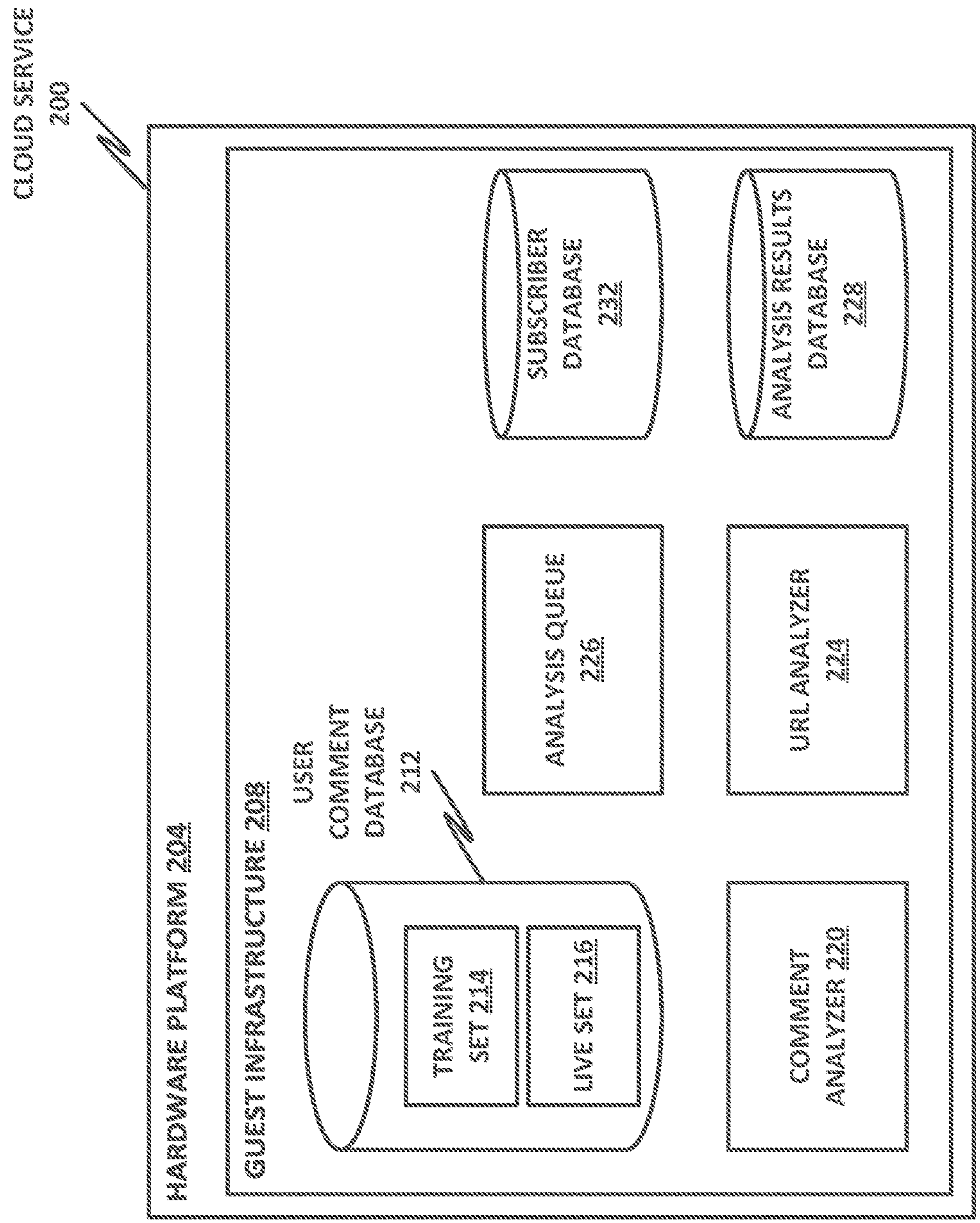
FIG. 2 is a block diagram of a cloud service.
Figure 6:
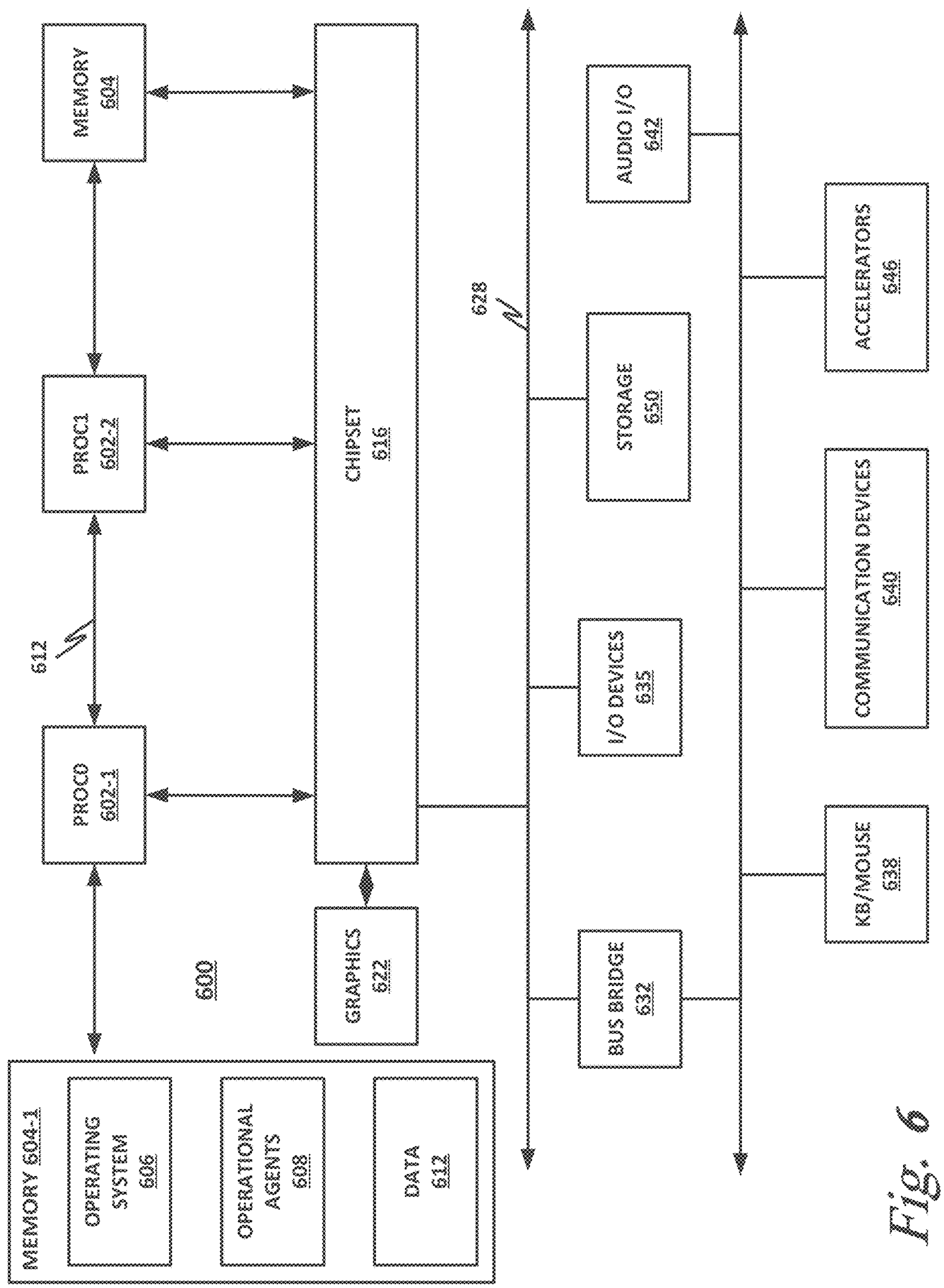
FIG. 6 is a block diagram of selected elements of a hardware platform.
Figure 7:
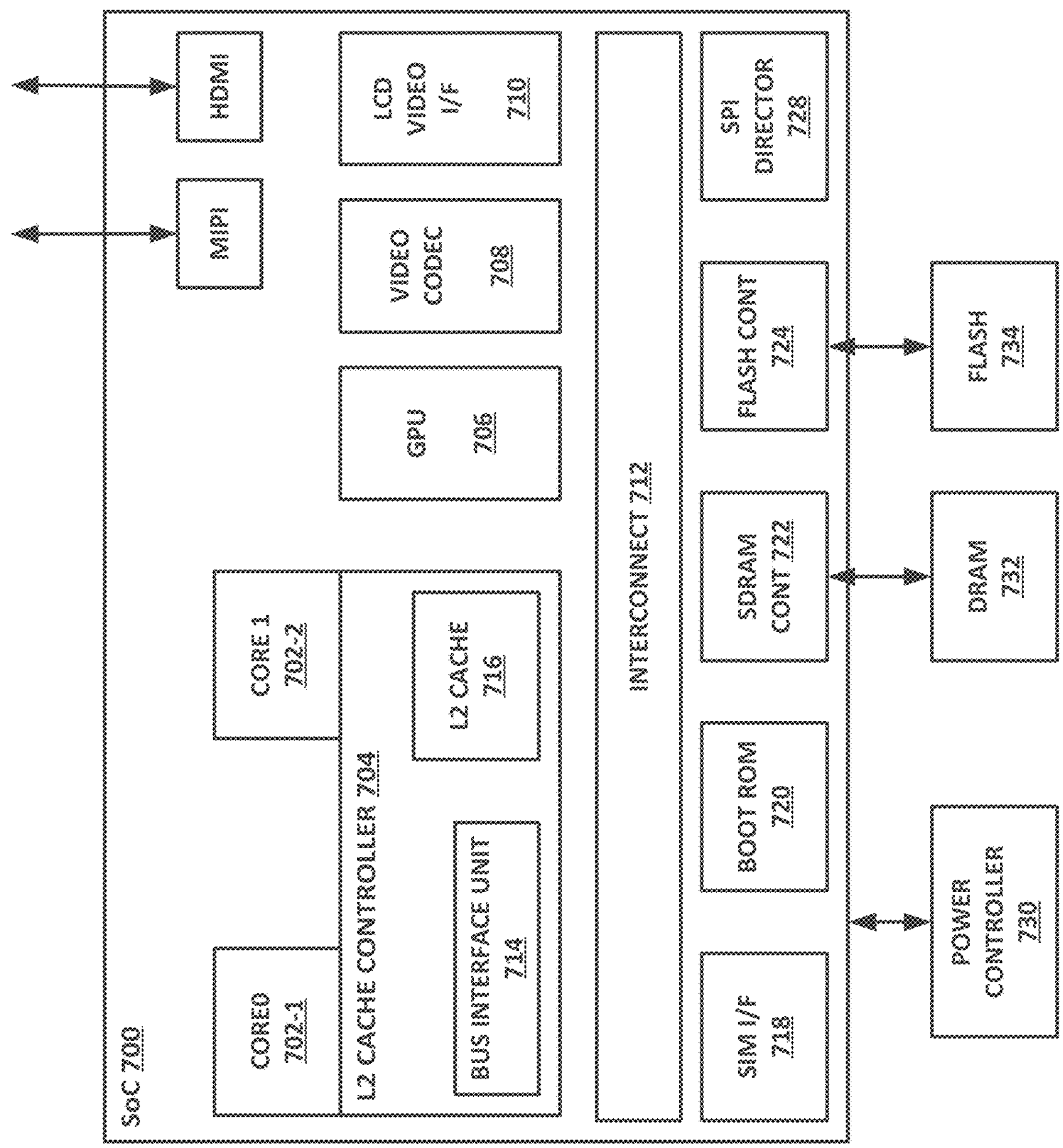
FIG. 7 is a block diagram of selected elements of a system-on-a-chip (SoC).
Figure 8:
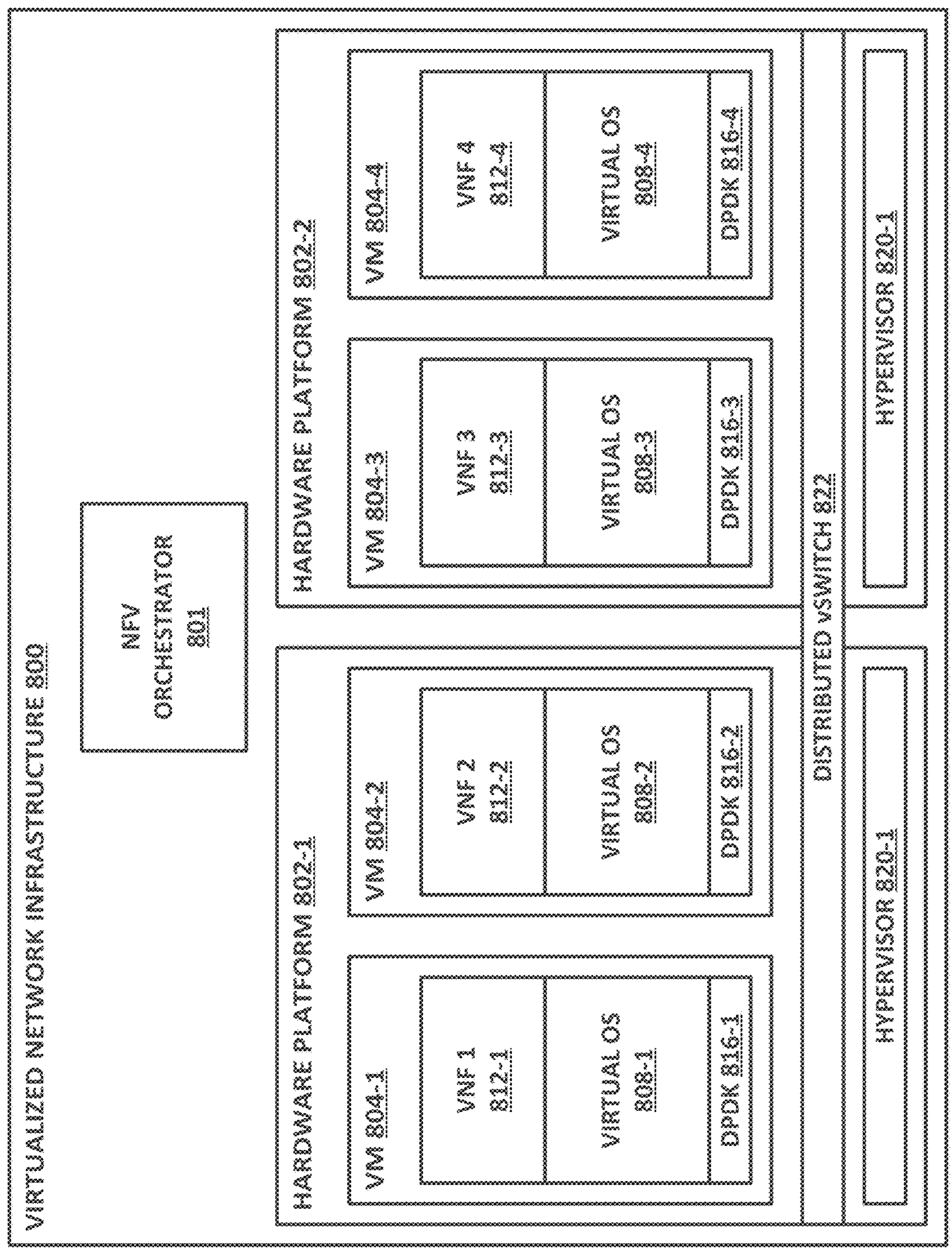
FIG. 8 is a block diagram of selected elements of a network function virtualization (NFV) infrastructure.

FIG. 2 is a block diagram of selected elements of a cloud service 200. Cloud service 200 may include a hardware platform 204. Hardware platform 204 provides the necessary hardware to perform the functions. FIGS. 6 and 7 below illustrate a hardware platform that may be used with cloud service 200. FIG. 8 below illustrates a network function virtualization infrastructure, which may be used to provide virtual network functions. This could include virtualization of some or all of the features of cloud service 200. Furthermore, FIG. 9 below illustrates a containerization infrastructure. Containerization may also be used to implement some or all of the features illustrated for cloud service 200.

In this example, hardware platform 204 provides a guest infrastructure 208. Guest infrastructure 208 may provide the underlying services or structure to provide guest services, such as virtualization and/or containerization.

Cloud service 200 also includes a user comment database 212. User comment database 212 may receive incoming user comments, for example, via a network interface. Subscribed users, such as clients or customers of the security services vendor, may have an account that gives them privileges to submit comments to user comment database 212. In an example, user comment database 212 may be divided into a training set 214 and a live set 216. Training set 214 may be used to train a ML model to recognize factors such as user sentiment, strength of sentiment model, and other information about user comments. FIGS. 10-13 below illustrate some operative principles upon which the ML model may be based. To simplify the explanation, FIGS. 10-13 below illustrate an illustrative AI problem involving number recognition. However, the principles illustrated in those FIGURES may be applied to any of the AI problems presented in this specification, such as sentiment, sentiment strength, and URL classification, by way of illustrative and nonlimiting example.

This ML model may be referred to as a sentiment model. A sentiment model can be trained on training set 214 and can then operate on live set 216 to analyze live user feedback. Furthermore, in some cases, data from live set 216 may be used to further refine the sentiment model, and thus may become part of training set 214.

Comment analyzer 220 includes the sentiment model and any other features or modules that may be used to analyze a comment for user sentiment or other factors. The output of comment analyzer 220 is, in one illustrative embodiment, a predicted reputation based on the user comment. This may appear as a value between zero and one. In one example, zero represents a highly positive reputation ("clean"), while one represents a highly negative reputation ("dirty"). The reverse could also be used.

The output of comment analyzer 220 may be used by URL analyzer 224 as an input into its URL analysis. For example, URL analyzer 224 may also include certain ML models and may use those to analyze websites. URL analyzer 224 may also include an ordered analysis queue 226. Analysis queue 226 may include an ordered list of URLs that are to be analyzed. Because of the large number of new URLs that may be encountered in a day, it may not be possible for cloud service 200 to immediately analyze each URL in real-time. Rather, an analysis queue 226 may be maintained to prioritize analysis of certain URLs. When a user comment is submitted, that may bump the URL to or near the front of the line for analysis. It may also add the URL to the analysis queue it was not previously in the analysis queue (e.g., because it already had a valid analysis that has not yet expired). In some cases, the strength of the user sentiment may also influence where a URL is placed in the analysis queue.

Figure 3:
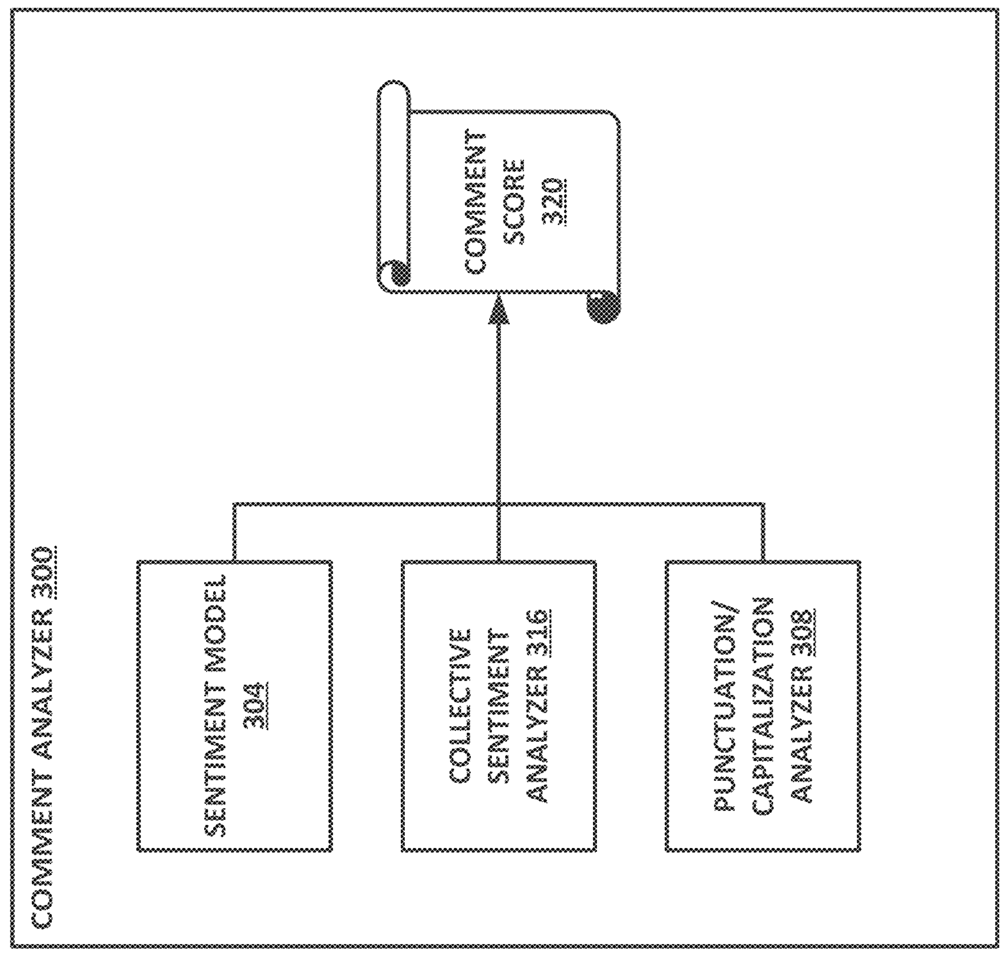
FIG. 3 is a block diagram of a comment analyzer.

URL analyzer 224 provides a reputation score for the URL and stores the reputation in an analysis results database 228. The URL reputation is then available to subscribers, for example, those who appear in subscriber database 232. Subscribers may query cloud service 200 for URL reputations and receive a reputation in response to the query. The URL reputations can then be used, for example, to implement policy, such as blocking, quarantining, warning, or taking some other action on certain classes or categories of URLs or individual URLs. FIG. 3 is a block diagram of selected elements of a comment analyzer 300. Comment analyzer 300 may be an embodiment of comment analyzer 220 of FIG. 2, a separate module, a separate hardware system, an application-specific integrated circuit, a field-programmable gate array, or some combination thereof.

Comment analyzer 300 includes a trained sentiment model 304. Sentiment model 304 has been pretrained, such as on a set of training data, consisting of user comments with known sentiments. Sentiment model 304 may produce an initial sentiment score for a comment. Sentiment model 304 could also operate on a group of comments.

A punctuation/capitalization analyzer 308 may also be included. Punctuation and capitalization may be used to help determine the strength of a sentiment. For example, it has been observed that a user who types in all caps or that uses exclamation marks generally has stronger sentiment than other users. In addition to strength of sentiment, capitalization and punctuation can also help to determine the type of comment. For example, users who type in all caps and use many exclamation marks are more likely to be asking for a site to be green-lighted than for a site to be red-lighted. This sentiment may arise, for example, from frustration because the user is trying to access a website and has been denied access. A user who merely notices that a website should be blocked tends to be less emotionally invested in the comment. This punctuation and capitalization analysis can be combined with the trained NLP engine model of sentiment model 304 to provide enhanced sentiment detection.

A collective sentiment aggregator 316 can also be used. Collective sentiment aggregator 316 may help to prevent abuse of the system, such as by the submission of malicious reviews or comments. When multiple comments are directed to the same URL, the comments may be analyzed for sentiment, and the sentiments may be aggregated into a collective sentiment score. If an individual comment has an individual sentiment that varies greatly from the collective sentiment score (e.g., if it is more than N standard deviations removed from the collective sentiment, where N is a configurable number, then this may indicate that something is amiss). It is possible for an individual sentiment to differ greatly from the collective sentiment and, in particular, it is possible for a newer sentiment to be more accurate because of changed data. However, there is also a danger of malicious or deliberate mischaracterization of a sentiment. In that case, if the sentiment score deviates greatly from the collective sentiment, then it may be beneficial to ignore the sentiment for purposes of performing the URL analysis. In other words, in the general case, the user sentiment may be used as an input to the URL analysis, similar to other inputs or factors. But in the case of a highly deviant sentiment, the sentiment may be ignored in favor of other analysis factors. Furthermore, a reputation of a user or enterprise submitting the comment may also be accounted for. For example, if a user with a very high reputation for reliability submits a comment that is highly deviant from the collective sentiment, this may be a genuine indication that something has changed with the URL.

The use of collective sentiments can help reduce abuse and also prevents flip-flopping or toggling of the reputation from contradictory comments.

The final result is a comment score 320, which represents the user sentiment, sentiment strength, and other factors. This could be a single factor or a single score or a multidimensional score or vector that indicates the score along several variables, such as sentiment type, sentiment strength, user credibility, or other factors. This could also include a flag or other data that indicate whether the sentiment is reliable and should be included in the computation for the overall score or the overall reputation.

Figure 4:
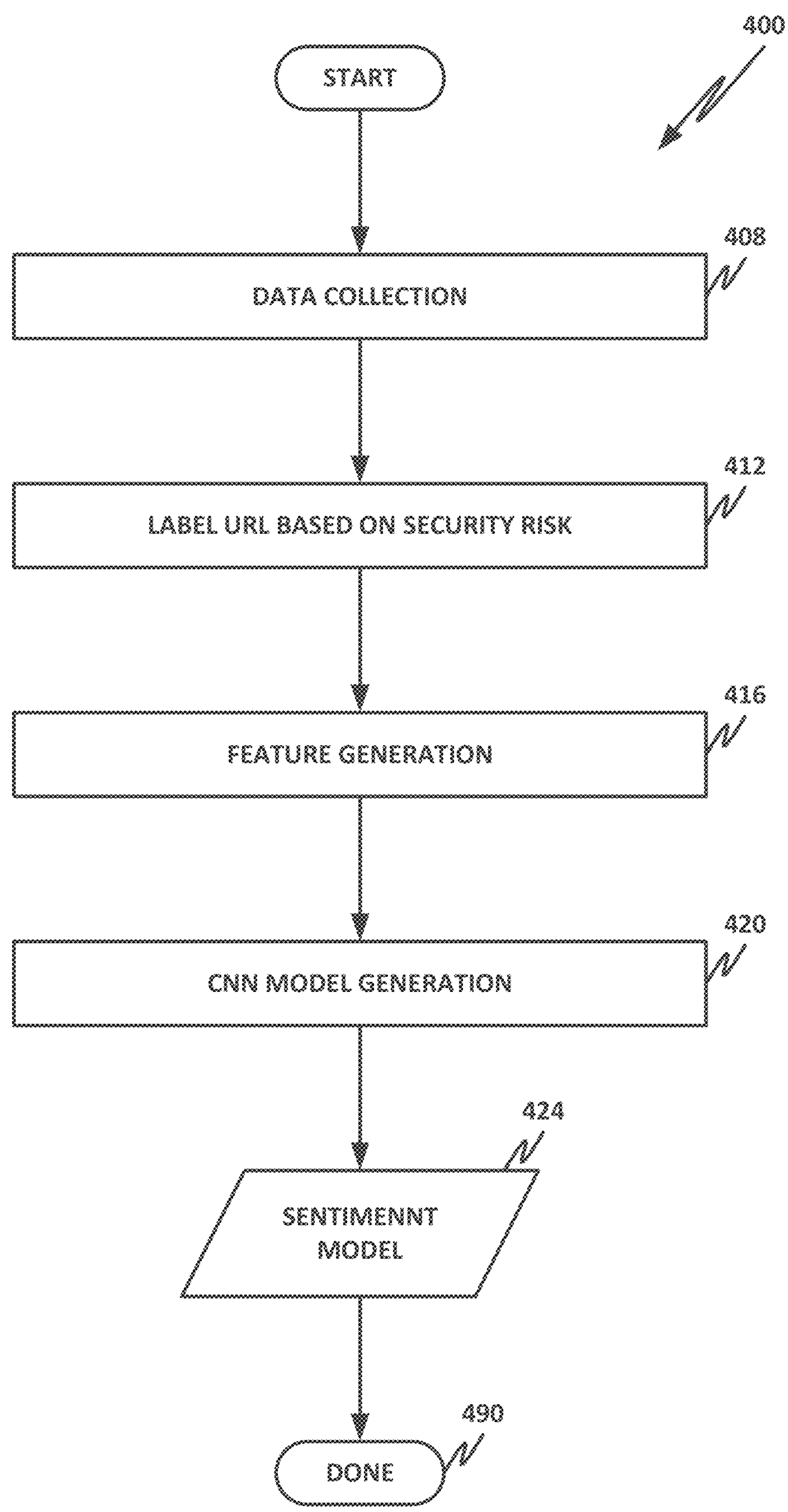
FIG. 4 is a flow chart of a method of training a model.

FIG. 4 is a flowchart of a method 400 of training an NLP model to provide sentiment analysis.

Starting at block 408, data collection occurs. Data collection includes collecting customers' requests that include URLs and comments about them. Illustrative examples:

"CleandomainXYZ.com." Comment: "my online store got hacked, but i cleaned up the infection now, please adjust the rating to green"

"DirtydomainXYZ.com." Comment: "Please check if this site is malicious. It was spotted in our network today contacting suspicious IP address outside of our geo."

"CleandomainXYZtwo.com." Comment: "please categorize this site so I can get into it!"

"CleandomainXYZthree.com." Comment: "OMG YOU BLOCKED MY SITE!!! WHAT'S GOING ON! PLEASE GREEN-LIGHT MY SITE AGAIN!"

In block 412, the URL is labeled based on its known security risk. Because this is a training phase, labels for the URL are already known.

In some examples, a supervised approach is used to training the algorithm. In block 416, the system performs feature generation. For example, the customer may be vectorized. In an example, the comment is parsed using customer submission metadata, and then a term frequency-inverse document frequency (TF-IDF) algorithm is used to vectorize the text of the customer comment. Other vectorizers include, for example, count vectorizers and others. TF-IDF may be used to increase the accuracy of the classifier. For example, this technique is commonly used in NLP. It quantifies the words in a document and generates a weight, which signifies the importance within each document and the whole purpose.

As described above, the system may also preserve punctuation and case sensitivity to retain the emotional component of the comment. From initial statistical analysis of the data, it has been found that customers who request sites adjusted from high-risk to safe use multiple exclamation points and many uppercase words. This occurs more frequently than for customers who report high-risk sites.

The system may also adjust the length of vectors by applying padding to short vectors and shortening very long ones. This is useful because some customers provide very short comments while other comments might be very long.

In block 420, the system generates the CNN model. Data from block 416 are used in the CNN training algorithm to produce a sentiment model. The output of the CNN generation is sentiment model 424.

In block 490, the method is done.

Figure 5:
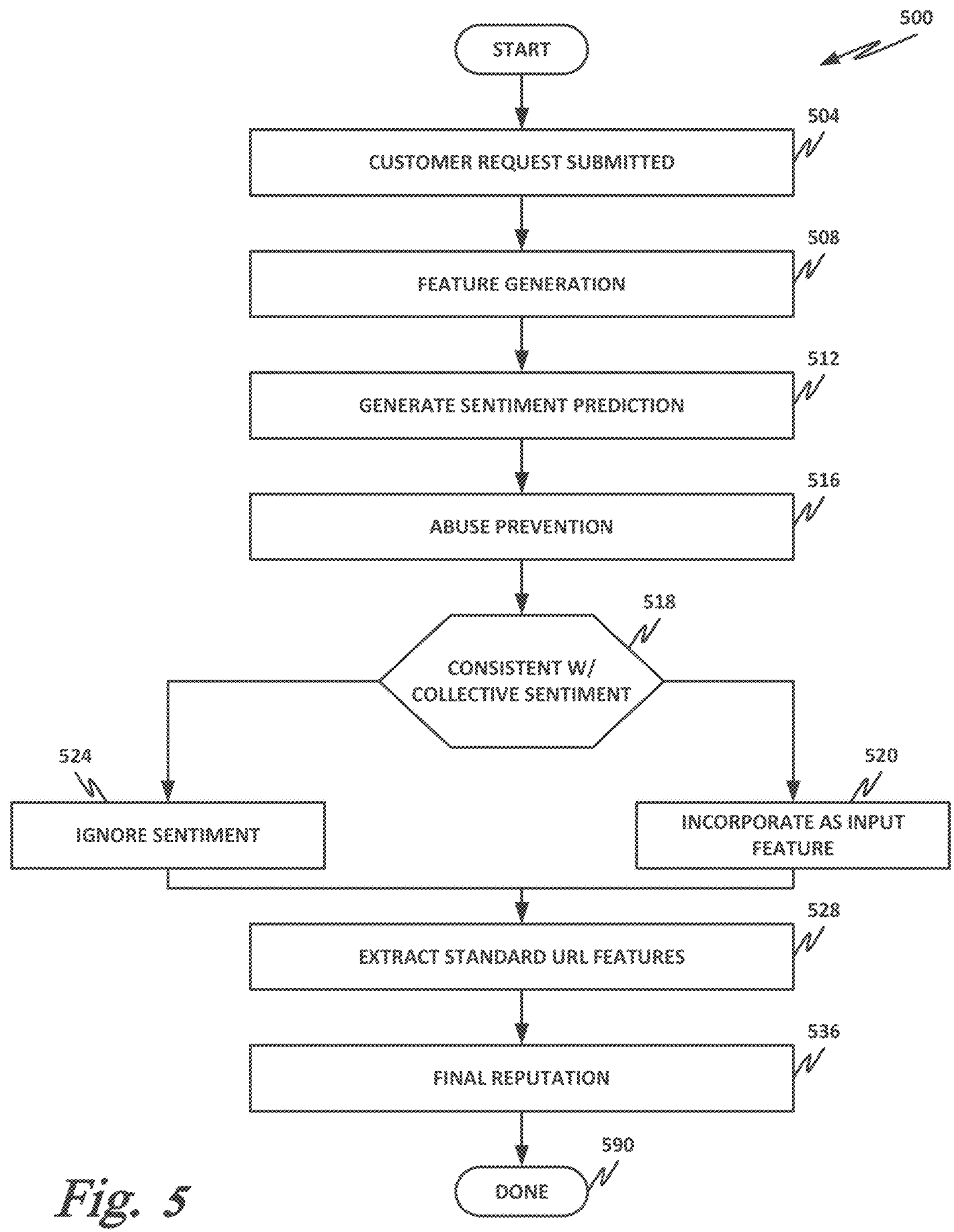
FIG. 5 is a flow chart of a method of applying a model.

FIG. 5 is a flowchart illustrating a method of sentiment model inference. Method 500 occurs when a customer submits a request with comments about the URL.

In block 504, the user or customer submits the request. This includes commentary about the URL. In some cases, the comment may be submitted via a web portal, email, SMS, or some other medium.

In block 508, feature generation occurs. As in the case of training, the comment is vectorized using, for example, TF-IDF and equal length vectors. The resultant vector can then be passed to a CNN model. In block 512, the CNN model generates the sentiment prediction. The CNN model provides the sentiment model discussed herein, and the output of the CNN model is a score between zero (clean) and one (malicious). If the score is below a predetermined threshold, this indicates the customer suspects the site is clean. If the score is above the threshold, it indicates the customer believes the site is dirty. The model score may then be passed to the final web reputation algorithm as a feature.

If only a single sentiment score is provided—as in the case where only a single comment has been submitted about a URL—the score can be used as a feature in the final web reputation calculation.

On the other hand, if multiple comments are received, then abuse prevention block 516 may be implemented. Abuse prevention occurs when the URL has more than one sentiment score, in which case care may be needed to ensure that the system is not being abused by someone trying to intentionally provide incorrect security risk recommendations. Care should also be taken to prevent URLs from toggling between low and high-risk automation.

All customers or comments who submit a request for the same URL can contribute to an overall collective sentiment. Abuse prevention block 516 provides collective sentiment to decision block 518. In decision block 518, the system determines whether the collective sentiment is consistent with the predicted sentiment. If the current sentiment score contradicts the overall collective sentiments, then the prediction score from the sentiment model may be dropped in the final algorithm. On the other hand, if the current sentiment score agrees with the collective sentiment, then the highest score from all customers reporting the site (or, alternatively, the highest score from all customers reporting a site is malicious or, alternatively, the lowest score from customers reporting a site as clean) may be used as the sentiment feature in the final web reputation calculation.

The collective sentiment may be determined as the sum of all predicted sentiment scores divided by the number of customers or comments. Alternatively, sentiment scores could be weighted according to the reputation of a customer or a subscriber.

As described above, in block 520, if this current sentiment is useful according to the foregoing algorithm, then the sentiment score is incorporated as a input feature to the final URL model.

In block 524, if the sentiment score is deemed to not be useful, such as because it is inconsistent with the collective sentiment, then the final model may ignore the sentiment as an input feature.

In block 528, the system may use a known URL analysis algorithm to extract standard URL features.

In block 536, the system computes a final web reputation predicted score based on those features. As described above, the user sentiment may or may not be an input feature to this analysis depending on the predicted reliability of the sentiment.

Note that the first time a ticket comes in, the collective sentiment is the value of the sentiment score for the initial ticket. As additional tickets are submitted for the same URL, collective sentiment score can be updated accordingly.

Supervised learning relies on high quality of labels and predictive features. Collective sentiment provides the capability to filter out records that would be deemed as an unreliable label (during training) and unreliable sentiment scores (during inference).

In some embodiments, the web reputation model inference occurs for every incoming ticket. If the sentiment score for the new ticket is within a configurable standard deviation value of the collective sentiment score, then the collective sentiment score is used as an additional feature in the final web reputation algorithm. If it is not, the abuse prevention measures may be applied and the sentiments may be ignored in the final web reputation algorithm.

In block 590, the method is done.

FIG. 6 is a block diagram of a hardware platform 600. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 600, even though they may be scattered across a data center, or even located in different data centers.

Hardware platform 600 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 600 is arranged in a point-to-point (PtP) configuration. This PtP configuration is popular for personal computer (PC) and server-type devices, although it is not so limited, and any other bus type may be used.

Hardware platform 600 is an example of a platform that may be used to implement embodiments of the teachings of this specification. For example, instructions could be stored in storage 650. Instructions could also be transmitted to the hardware platform in an ethereal form, such as via a network interface, or retrieved from another source via any suitable interconnect. Once received (from any source), the instructions may be loaded into memory 604, and may then be executed by one or more processor 602 to provide elements such as an operating system 606, operational agents 608, or data 612.

Hardware platform 600 may include several processors 602. For simplicity and clarity, only processors PROC0 602-1 and PROC1 602-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 602 may be any type of processor and may communicatively couple to chipset 616 via, for example, PtP interfaces. Chipset 616 may also exchange data with other elements, such as a high performance graphics adapter 622. In alternative embodiments, any or all of the PtP links illustrated in FIG. 6 could be implemented as any type of bus, or other configuration rather than a PtP link. In various embodiments, chipset 616 may reside on the same die or package as a processor 602 or on one or more different dies or packages. Each chipset may support any suitable number of processors 602. A chipset 616 (which may be a chipset, uncore, Northbridge, Southbridge, or other suitable logic and circuitry) may also include one or more controllers to couple other components to one or more CPUs.

Two memories, 604-1 and 604-2 are shown, connected to PROC0 602-1 and PROC1 602-2, respectively. As an example, each processor is shown connected to its memory in a direct memory access (DMA) configuration, though other memory architectures are possible, including ones in which memory 604 communicates with a processor 602 via a bus. For example, some memories may be connected via a system bus, or in a data center, memory may be accessible in a remote DMA (RDMA) configuration.

Memory 604 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 604 may be used for short, medium, and/or long-term storage. Memory 604 may store any suitable data or information utilized by platform logic. In some embodiments, memory 604 may also comprise storage for instructions that may be executed by the cores of processors 602 or other processing elements (e.g., logic resident on chipsets 616) to provide functionality.

In certain embodiments, memory 604 may comprise a relatively low-latency volatile main memory, while storage 650 may comprise a relatively higher-latency nonvolatile memory. However, memory 604 and storage 650 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 604 and storage 650, for example, in a single physical memory device, and in other cases, memory 604 and/or storage 650 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 622 may be configured to provide a human-readable visual output, such as a command-line interface (CLI) or graphical desktop such as Microsoft Windows, Apple OSX desktop, or a Unix/Linux X Window System-based desktop. Graphics adapter 622 may provide output in any suitable format, such as a coaxial output, composite video, component video, video graphics array (VGA), or digital outputs such as digital visual interface (DVI), FPDLink, DisplayPort, or high-definition multimedia interface (HDMI), by way of nonlimiting example. In some examples, graphics adapter 622 may include a hardware graphics card, which may have its own memory and its own graphics processing unit (GPU).

Chipset 616 may be in communication with a bus 628 via an interface circuit. Bus 628 may have one or more devices that communicate over it, such as a bus bridge 632, I/O devices 635, accelerators 646, communication devices 640, and a keyboard and/or mouse 638, by way of nonlimiting example. In general terms, the elements of hardware platform 600 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 640 can broadly include any communication not covered by a network interface and the various I/O devices described herein. This may include, for example, various universal serial bus (USB), FireWire, Lightning, or other serial or parallel devices that provide communications.

I/O Devices 635 may be configured to interface with any auxiliary device that connects to hardware platform 600 but that is not necessarily a part of the core architecture of hardware platform 600. A peripheral may be operable to provide extended functionality to hardware platform 600, and may or may not be wholly dependent on hardware platform 600. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 642 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 632 may be in communication with other devices such as a keyboard/mouse 638 (or other input devices such as a touch screen, trackball, etc.), communication devices 640 (such as modems, network interface devices, peripheral interfaces such as PCI or PCIe, or other types of communication devices that may communicate through a network), audio I/O 642, a data storage device 644, and/or accelerators 646. In alternative embodiments, any portions of the bus architectures could be implemented with one or more PtP links.

Operating system 606 may be, for example, Microsoft Windows, Linux, UNIX, Mac OS X, iOS, MS-DOS, or an embedded or real-time operating system (including embedded or real-time flavors of the foregoing). In some embodiments, a hardware platform 600 may function as a host platform for one or more guest systems that invoke application (e.g., operational agents 608).

Operational agents 608 may include one or more computing engines that may include one or more non-transitory computer-readable mediums having stored thereon executable instructions operable to instruct a processor to provide operational functions. At an appropriate time, such as upon booting hardware platform 600 or upon a command from operating system 606 or a user or security administrator, a processor 602 may retrieve a copy of the operational agent (or software portions thereof) from storage 650 and load it into memory 604. Processor 602 may then iteratively execute the instructions of operational agents 608 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 600 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fiber Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 600 may be virtualized, in particular the processor (s) and memory. For example, a virtualized environment may run on OS 606, or OS 606 could be replaced with a hypervisor or virtual machine manager. In this configuration, a virtual machine running on hardware platform 600 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 6 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 7. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

FIG. 7 is a block illustrating selected elements of an example SoC 700. At least some of the teachings of the present specification may be embodied on an SoC 700, or may be paired with an SoC 700. SoC 700 may include, or may be paired with, an advanced reduced instruction set computer machine (ARM) component. For example, SoC 700 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 700 could also be integrated into, for example, a PC, server, video processing components, laptop computer, notebook computer, netbook, or touch-enabled device.

As with hardware platform 600 above, SoC 700 may include multiple cores 702-1 and 702-2. In this illustrative example, SoC 700 also includes an L2 cache control 704, a GPU 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/HDMI links that couple to an LCD.

SoC 700 may also include a subscriber identity module (SIM) I/F 718, a boot ROM 720, a synchronous dynamic random access memory (SDRAM) controller 722, a flash controller 724, a serial peripheral interface (SPI) director 728, a suitable power control 730, a dynamic RAM (DRAM) 732, and flash 734. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 700 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 8 is a block diagram of a NFV infrastructure 800. NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 800. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 8, an NFV orchestrator 801 manages a number of the VNFs 812 running on an NFVI 800. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 801 a valuable system resource. Note that NFV orchestrator 801 may provide a browser-based or graphical configuration interface, and in some embodiments may be integrated with SDN orchestration functions.

Note that NFV orchestrator 801 itself may be virtualized (rather than a special-purpose hardware appliance). NFV orchestrator 801 may be integrated within an existing SDN system, wherein an operations support system (OSS) manages the SDN. This may interact with cloud resource management systems (e.g., OpenStack) to provide NFV orchestration. An NFVI 800 may include the hardware, software, and other infrastructure to enable VNFs to run. This may include a hardware platform 802 on which one or more VMs 804 may run. For example, hardware platform 802-1 in this example runs VMs 804-1 and 804-2. Hardware platform 802-2 runs VMs 804-3 and 804-4. Each hardware platform may include a hypervisor 820, virtual machine manager (VMM), or similar function, which may include and run on a native (bare metal) operating system, which may be minimal so as to consume very few resources.

Hardware platforms 802 may be or comprise a rack or several racks of blade or slot servers (including, e.g., processors, memory, and storage), one or more data centers, other hardware resources distributed across one or more geographic locations, hardware switches, or network interfaces. An NFVI 800 may also include the software architecture that enables hypervisors to run and be managed by NFV orchestrator 801.

Running on NFVI 800 are a number of VMs 804, each of which in this example is a VNF providing a virtual service appliance. Each VM 804 in this example includes an instance of the Data Plane Development Kit (DPDK), a virtual operating system 808, and an application providing the VNF 812.

Virtualized network functions could include, as nonlimiting and illustrative examples, firewalls, intrusion detection systems, load balancers, routers, session border controllers, DPI services, network address translation (NAT) modules, or call security association.

The illustration of FIG. 8 shows that a number of VNFs 804 have been provisioned and exist within NFVI 800. This FIGURE does not necessarily illustrate any relationship between the VNFs and the larger network, or the packet flows that NFVI 800 may employ.

The illustrated DPDK instances 816 provide a set of highly-optimized libraries for communicating across a virtual switch (vSwitch) 822. Like VMs 804, vSwitch 822 is provisioned and allocated by a hypervisor 820. The hypervisor uses a network interface to connect the hardware platform to the data center fabric (e.g., a host fabric interface (HFI)). This HFI may be shared by all VMs 804 running on a hardware platform 802. Thus, a vSwitch may be allocated to switch traffic between VMs 804. The vSwitch may be a pure software vSwitch (e.g., a shared memory vSwitch), which may be optimized so that data are not moved between memory locations, but rather, the data may stay in one place, and pointers may be passed between VMs 804 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 822 is illustrated, wherein vSwitch 822 is shared between two or more physical hardware platforms 802.

Figure 9:
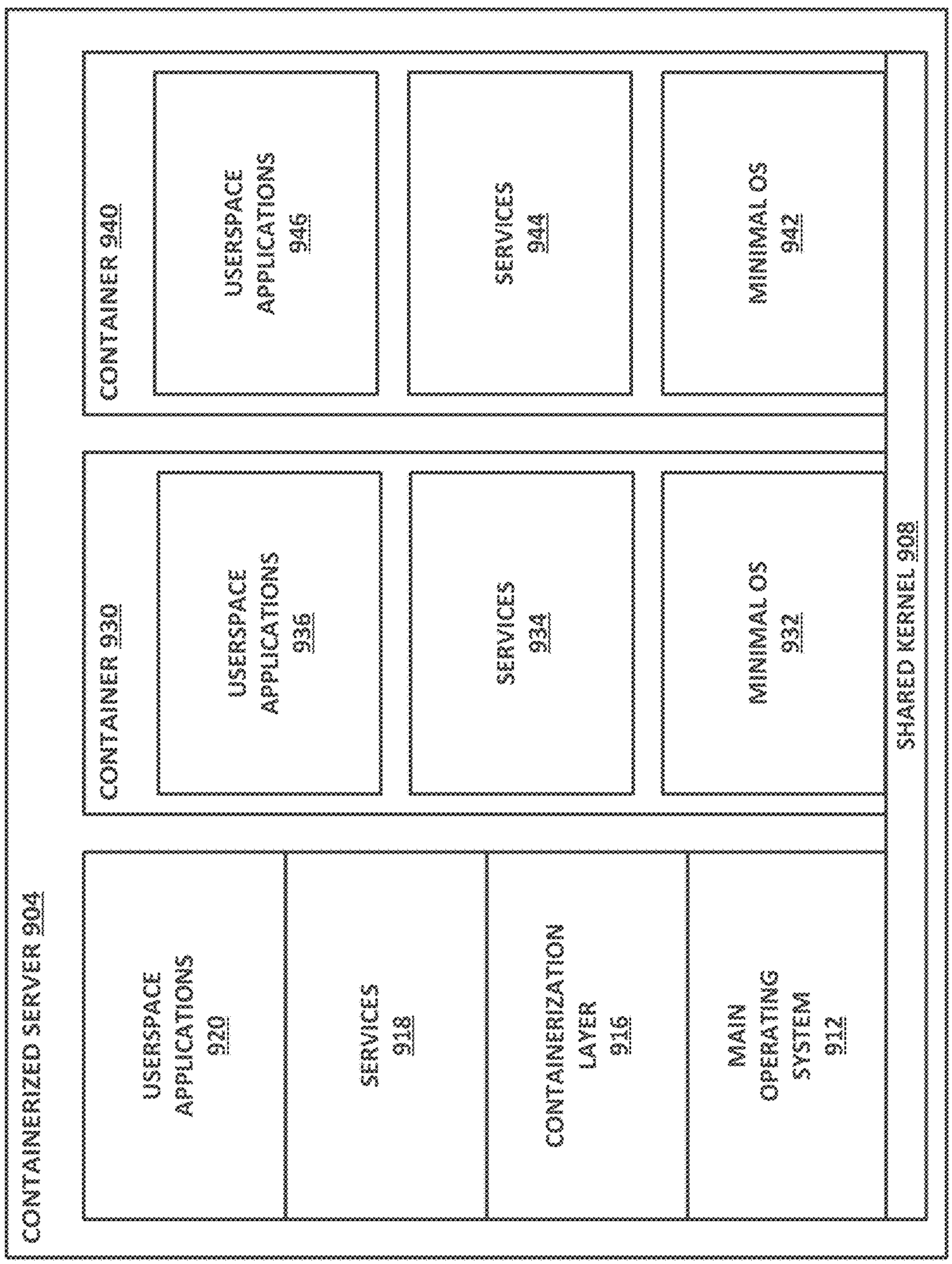
FIG. 9 is a block diagram of selected elements of a containerization infrastructure.

FIG. 9 is a block diagram of selected elements of a containerization infrastructure 900. Like virtualization, containerization is a popular form of providing a guest infrastructure.

Containerization infrastructure 900 runs on a hardware platform such as containerized server 904. Containerized server 904 may provide a number of processors, memory, one or more network interfaces, accelerators, and/or other hardware resources.

Running on containerized server 904 is a shared kernel 908. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 908 is main operating system 912. Commonly, main operating system 912 is a Unix or Linux-based operating system, although containerization infrastructure is also available for other types of systems, including Microsoft Windows systems and Macintosh systems. Running on top of main operating system 912 is a containerization layer 916. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 912 may also include a number of services 918, which provide services and interprocess communication to userspace applications 920.

Services 918 and userspace applications 920 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 912, they inherit the same file and resource access permissions as those provided by shared kernel 908. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 904, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 904).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 904 hosts two containers, namely container 930 and container 940.

Container 930 may include a minimal operating system 932 that runs on top of shared kernel 908. Note that a minimal operating system is provided as an illustrative example, and is not mandatory. In fact, container 930 may perform as full an operating system as is necessary or desirable. Minimal operating system 932 is used here as an example simply to illustrate that in common practice, the minimal operating system necessary to support the function of the container (which in common practice, is a single or monolithic function) is provided.

On top of minimal operating system 932, container 930 may provide one or more services 934. Finally, on top of services 934, container 930 may also provide a number of userspace applications 936, as necessary.

Container 940 may include a minimal operating system 942 that runs on top of shared kernel 908. Note that a minimal operating system is provided as an illustrative example, and is not mandatory. In fact, container 940 may perform as full an operating system as is necessary or desirable. Minimal operating system 942 is used here as an example simply to illustrate that in common practice, the minimal operating system necessary to support the function of the container (which in common practice, is a single or monolithic function) is provided.

On top of minimal operating system 942, container 940 may provide one or more services 944. Finally, on top of services 944, container 940 may also provide a number of userspace applications 946, as necessary.

Using containerization layer 916, containerized server 904 may run a number of discrete containers, each one providing the minimal operating system and/or services necessary to provide a particular function. For example, containerized server 904 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

Figure 10:
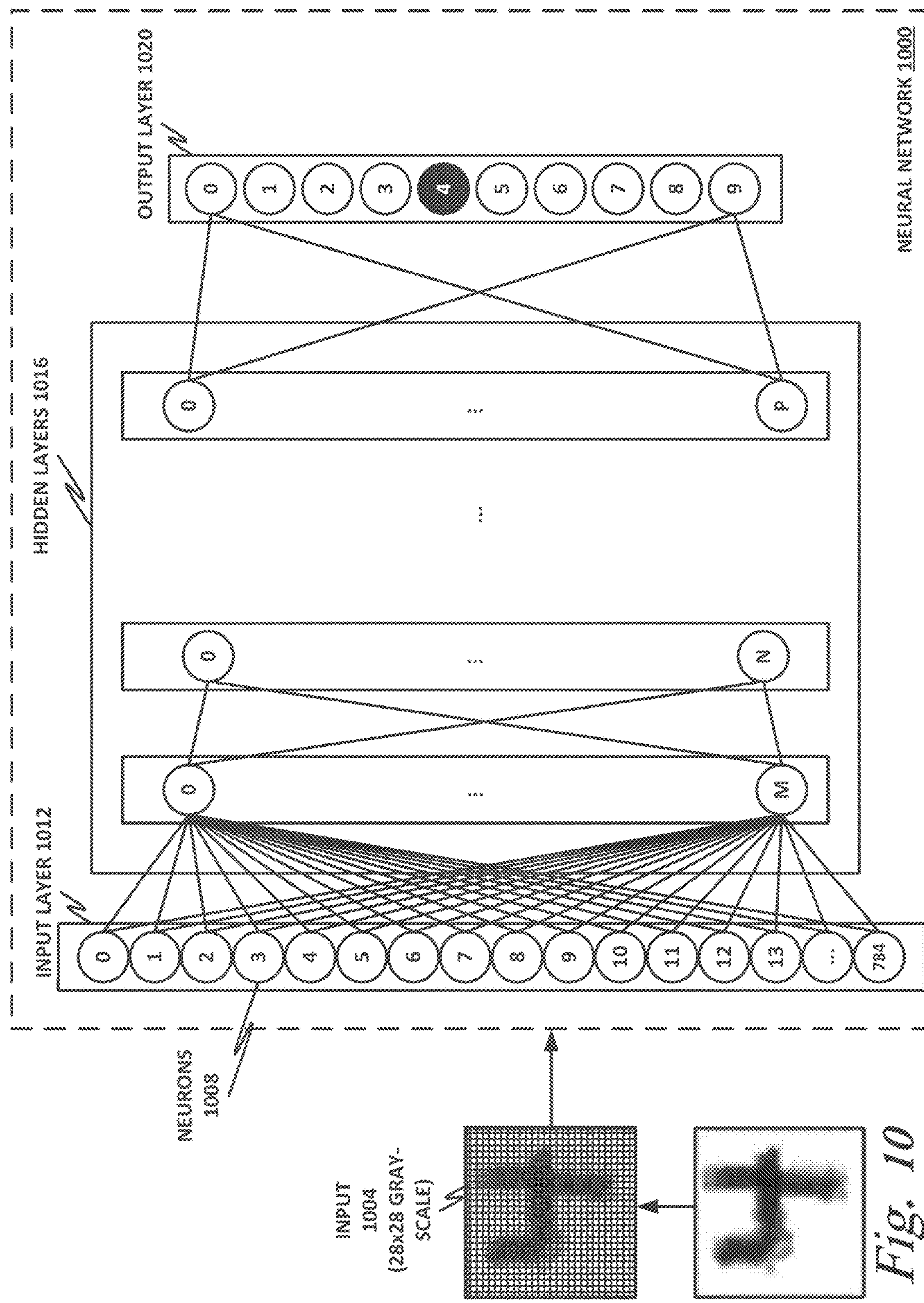
FIG. 10 illustrates machine learning according to a "textbook" problem with real-world applications.
Figure 11:
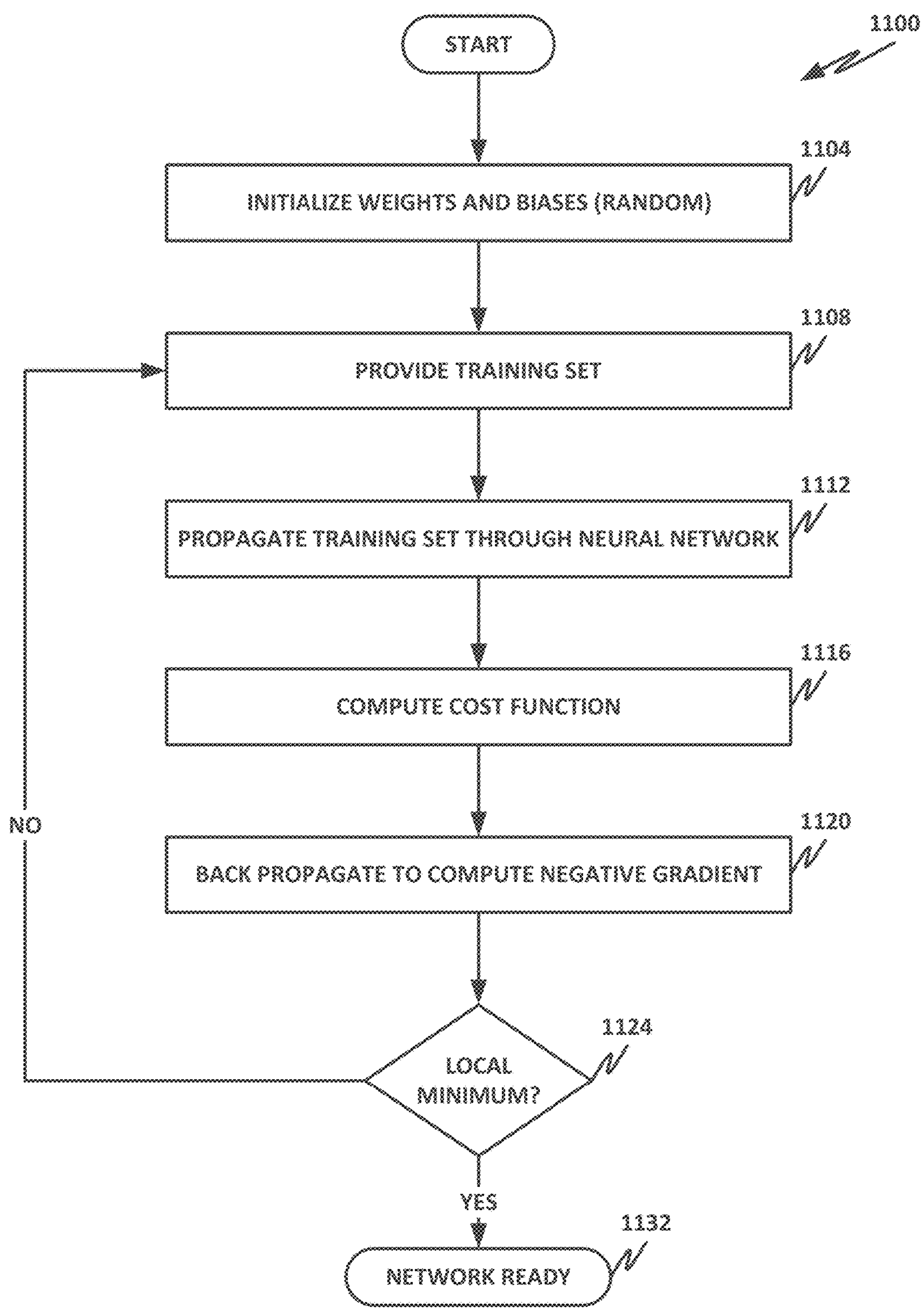
FIG. 11 is a flowchart of a method that may be used to train a neural network.
Figure 12:
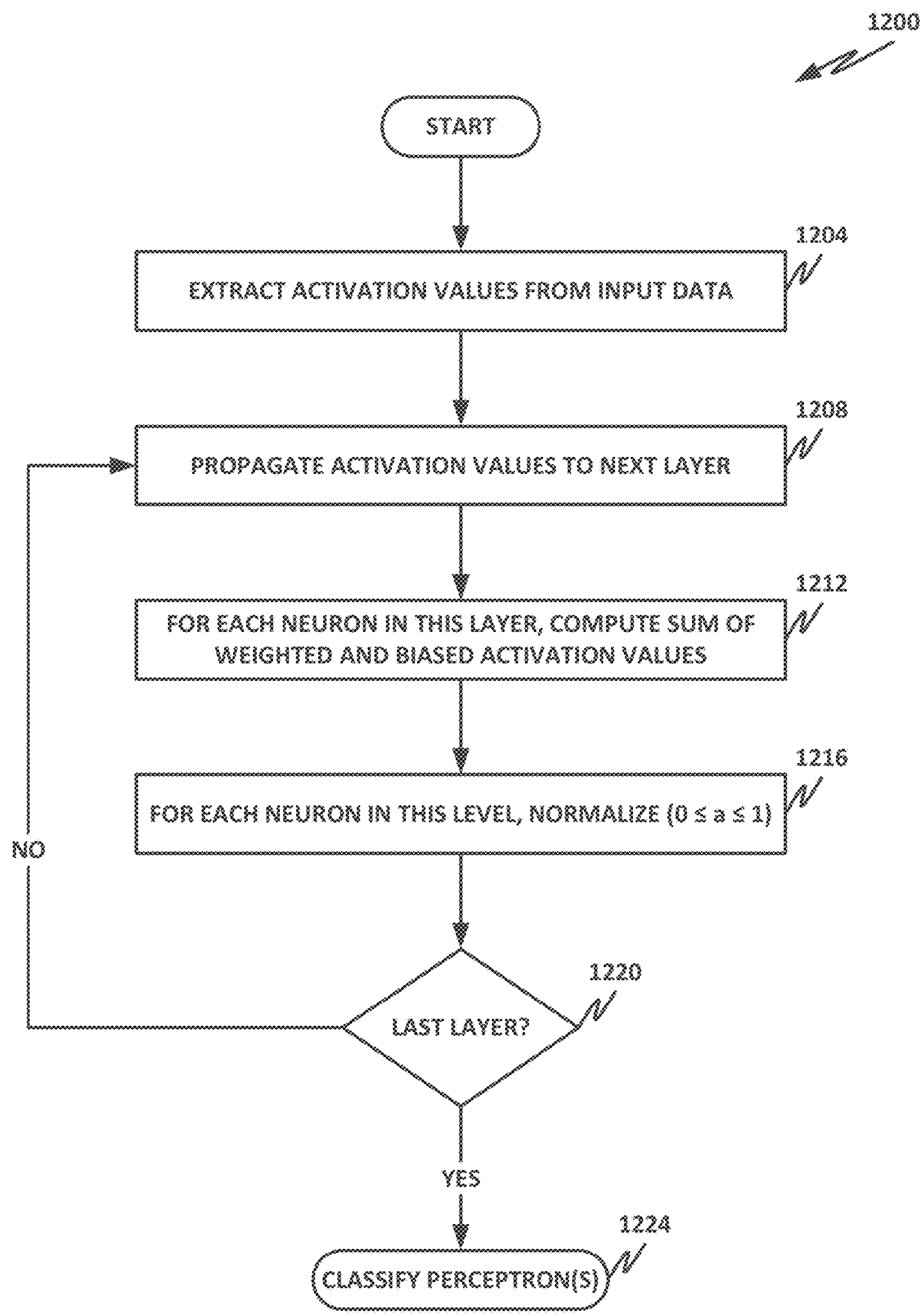
FIG. 12 is a flowchart of a method of using a neural network to classify an object.

FIGS. 10-12 illustrate selected elements of an AI system or architecture. In these FIGURES, an elementary neural network is used as a representative embodiment of an AI or ML architecture or engine. This should be understood to be a nonlimiting example, and other ML or AI architectures are available, including for example symbolic learning, robotics, computer vision, pattern recognition, statistical learning, speech recognition, NLP, deep learning, CNNs, recurrent neural networks, object recognition and/or others.

FIG. 10 illustrates ML according to a "textbook" problem with real-world applications. In this case, a neural network 1000 is tasked with recognizing characters. To simplify the description, neural network 1000 is tasked only with recognizing single digits in the range of 0 through 9. These are provided as an input image 1004. In this example, input image 1004 is a 28×28-pixel 8-bit grayscale image. In other words, input image 1004 is a square that is 28 pixels wide and 28 pixels high. Each pixel has a value between 0 and 255, with 0 representing white or no color, and 255 representing black or full color, with values in between representing various shades of gray. This provides a straightforward problem space to illustrate the operative principles of a neural network. It should be understood that only selected elements of neural network 1000 are illustrated in this FIGURE, and that real-world applications may be more complex, and may include additional features. Additional layers of complexity or functions may be provided in a neural network, or other AI architecture, to meet the demands of a particular problem. Indeed, the architecture here is sometimes referred to as the "Hello World" problem of ML, and is provided here as but one example of how the ML or AI functions of the present specification could be implemented.

In this case, neural network 1000 includes an input layer 1012 and an output layer 1020. In principle, input layer 1012 receives an input such as input image 1004, and at output layer 1020, neural network 1000 "lights up" a perceptron that indicates which character neural network 1000 thinks is represented by input image 1004.

Between input layer 1012 and output layer 1020 are some number of hidden layers 1016. The number of hidden layers 1016 will depend on the problem to be solved, the available compute resources, and other design factors. In general, the more hidden layers 1016, and the more neurons per hidden layer, the more accurate the neural network 1000 may become. However, adding hidden layers and neurons also increases the complexity of the neural network, and its demand on compute resources. Thus, some design skill is required to determine the appropriate number of hidden layers 1016, and how many neurons are to be represented in each hidden layer 1016.

Input layer 1012 includes, in this example, 784 "neurons" 1008. Each neuron of input layer 1012 receives information from a single pixel of input image 1004. Because input image 1004 is a 28×28 grayscale image, it has 784 pixels. Thus, each neuron in input layer 1012 holds 8 bits of information, taken from a pixel of input layer 1004. This 8-bit value is the "activation" value for that neuron.

Each neuron in input layer 1012 has a connection to each neuron in the first hidden layer in the network. In this example, the first hidden layer has neurons labeled 0 through M. Each of the M+1 neurons is connected to all 784 neurons in input layer 1012. Each neuron in hidden layer 1016 includes a kernel or transfer function, which is described in greater detail below. The kernel or transfer function determines how much "weight" to assign each connection from input layer 1012. In other words, a neuron in hidden layer 1016 may think that some pixels are more important to its function than other pixels. Based on this transfer function, each neuron computes an activation value for itself, which may be for example a decimal number between 0 and 1.

Each neuron in this layer is also connected to each neuron in the next layer, which has neurons from 0 to N. As in the previous layer, each neuron has a transfer function that assigns a particular weight to each of its M+1 connections, and computes its own activation value. In this manner, values are propagated along hidden layers 1016, until they reach the last layer, which has P+1 neurons labeled 0 through P. Each of these P+1 neurons has a connection to each neuron in output layer 1020. Output layer 1020 includes a number of neurons known as perceptrons that compute an activation value based on their weighted connections to each neuron in the last hidden layer 1016. The final activation value computed at output layer 1020 may be thought of as a "probability" that input image 1004 is the value represented by the perceptron. For example, if neural network 1000 operates perfectly, then perceptron 4 would have a value of 1.00, while each other perceptron would have a value of 0.00. This would represent a theoretically perfect detection. In practice, detection is not generally expected to be perfect, but it is desirable for perceptron 4 to have a value close to 1, while the other perceptrons have a value close to 0.

Conceptually, neurons in the hidden layers 1016 may correspond to "features." For example, in the case of computer vision, the task of recognizing a character may be divided into recognizing features such as the loops, lines, curves, or other features that make up the character. Recognizing each loop, line, curve, etc., may be further divided into recognizing smaller elements (e.g., line or curve segments) that make up that feature. Moving through the hidden layers from left to right, it is often expected and desired that each layer recognizes the "building blocks" that make up the features for the next layer. In practice, realizing this effect is itself a nontrivial problem, and may require greater sophistication in programming and training than is fairly represented in this simplified example.

The activation value for neurons in the input layer is simply the value taken from the corresponding pixel in the bitmap. The activation value (a) for each neuron in succeeding layers is computed according to a transfer function, which accounts for the "strength" of each of its connections to each neuron in the previous layer. The transfer can be written as a sum of weighted inputs (i.e., the activation value (a) received from each neuron in the previous layer, multiplied by a weight representing the strength of the neuron-to-neuron connection (w)), plus a bias value.

The weights may be used, for example, to "select" a region of interest in the pixmap that corresponds to a "feature" that the neuron represents. Positive weights may be used to select the region, with a higher positive magnitude representing a greater probability that a pixel in that region (if the activation value comes from the input layer) or a subfeature (if the activation value comes from a hidden layer) corresponds to the feature. Negative weights may be used for example to actively "de-select" surrounding areas or subfeatures (e.g., to mask out lighter values on the edge), which may be used for example to clean up noise on the edge of the feature. Pixels or subfeatures far removed from the feature may have for example a weight of zero, meaning those pixels should not contribute to examination of the feature.

The bias (b) may be used to set a "threshold" for detecting the feature. For example, a large negative bias indicates that the "feature" should be detected only if it is strongly detected, while a large positive bias makes the feature much easier to detect.

The biased weighted sum yields a number with an arbitrary sign and magnitude. This real number can then be normalized to a final value between 0 and 1, representing (conceptually) a probability that the feature this neuron represents was detected from the inputs received from the previous layer. Normalization may include a function such as a step function, a sigmoid, a piecewise linear function, a Gaussian distribution, a linear function or regression, or the popular "rectified linear unit" (ReLU) function. In the examples of this specification, a sigmoid function notation (a) is used by way of illustrative example, but it should be understood to stand for any normalization function or algorithm used to compute a final activation value in a neural network.

The transfer function for each neuron in a layer yields a scalar value. For example, the activation value for neuron "0" in layer "1" (the first hidden layer), may be written as:

$$a_0^{(1)}=\sigma(w_0 a_0^{(0)}+w_1 a_1^{(0)}+ \ldots w_{783} a_{783}^{(0)}+b)$$

In this case, it is assumed that layer 0 (input layer 1012) has 784 neurons. Where the previous layer has "n" neurons, the function can be generalized as:

$$a_0^{(1)}=\sigma(w_0 a_0^{(0)}+w_1 a_1^{(0)}+ \ldots w_n a_n^{(0)}+b)$$

A similar function is used to compute the activation value of each neuron in layer 1 (the first hidden layer), weighted with that neuron's strength of connections to each neuron in layer 0, and biased with some threshold value. As discussed above, the sigmoid function shown here is intended to stand for any function that normalizes the output to a value between 0 and 1.

The full transfer function for layer 1 (with k neurons in layer 1) may be written in matrix notation as:

$$a^{(1)} = \sigma\left(\begin{bmatrix} w_{0,0} & \ldots & w_{0,n} \\ \vdots & \ddots & \vdots \\ w_{(k,0)} & \ldots & w_{k,n} \end{bmatrix} \begin{bmatrix} a_0^{(0)} \\ \vdots \\ a_n^{(0)} \end{bmatrix} + \begin{bmatrix} b_0 \\ \vdots \\ b_n \end{bmatrix}\right)$$

More compactly, the full transfer function for layer 1 can be written in vector notation as:

$$a^{(1)}=\sigma(Wa^{(0)}+b)$$

Neural connections and activation values are propagated throughout the hidden layers 1016 of the network in this way, until the network reaches output layer 1020. At output layer 1020, each neuron is a "bucket" or classification, with the activation value representing a probability that the input object should be classified to that perceptron. The classifications may be mutually exclusive or multinominal. For example, in the computer vision example of character recognition, a character may best be assigned only one value, or in other words, a single character is not expected to be simultaneously both a "4" and a "9." In that case, the neurons in output layer 1020 are binomial perceptrons. Ideally, only one value is above the threshold, causing the perceptron to metaphorically "light up," and that value is selected. In the case where multiple perceptrons "light up," the one with the highest probability may be selected. The final result is that only one value (in this case, "4") should be "lit up," while the rest should be "dark." Indeed, if the neural network were perfect, the "4" neuron would have an activation value of 1.00, while each other neuron would have an activation value of 0.00.

In the case of multinominal perceptrons, more than one output may be "lit up." For example, a neural network may determine that a particular document has high activation values for perceptrons corresponding to several departments, such as accounting, Information Technology (IT), and Human Resources. On the other hand, the activation values for perceptrons for Legal, Manufacturing, and Shipping are low. In the case of multinominal classification, a threshold may be defined, and any neuron in the output layer with a probability above the threshold may be considered a "match" (e.g., the document is relevant to those departments). Those below the threshold are considered not a match (e.g., the document is not relevant to those departments).

The weights and biases of the neural network act as parameters, or "controls," wherein features in a previous layer are detected and recognized. When the neural network is first initialized, the weights and biases may be assigned randomly or pseudo-randomly. Thus, because the weights-and-biases controls are garbage, the initial output is expected to be garbage. In the case of a "supervised" learning algorithm, the network is refined by providing a "training" set, which includes a number of objects with known results. Because the "right" answer for each object is known, training sets can be used to iteratively move the weights and biases away from garbage values, and toward more useful values.

A common method for refining values includes "gradient descent" and "back-propagation." An illustrative gradient descent method includes computing a "cost" function, which measures the error in the network. For example, in the illustration, the "4" perceptron ideally has a value of "1.00," while the other perceptrons have an ideal value of "0.00." The cost function takes the difference between each output and its ideal value, squares the difference, and then takes a sum of all of the differences. Each training example will have its own computed cost. Initially, the cost function is very large, because the network doesn't know how to classify objects. As the network is trained and refined, the cost function value is expected to get smaller, as the weights and biases are adjusted toward more useful values.

With, for example, 100,000 training examples in play, an average cost (e.g., a mathematical mean) can be computed across all 100,00 training examples. This average cost provides a quantitative measurement of how "badly" the neural network is doing its detection job.

The cost function can thus be thought of as a single, very complicated formula, where the inputs are the parameters (weights and biases) of the network. Because the network may have thousands or even millions of parameters, the cost function has thousands or millions of input variables. The output is a single value representing a quantitative measurement of the error of the network. The cost function can be represented as:

$$C(w)$$

Wherein w is a vector containing all of the parameters (weights and biases) in the network. The minimum (absolute and/or local) can then be represented as a trivial calculus problem, namely:

$$\frac{dC}{dw}(w) = 0$$

Solving such a problem symbolically may be prohibitive, and in some cases not even possible, even with heavy computing power available. Rather, neural networks commonly solve the minimizing problem numerically. For example, the network can compute the slope of the cost function at any given point, and then shift by some small amount depending on whether the slope is positive or negative. The magnitude of the adjustment may depend on the magnitude of the slope. For example, when the slope is large, it is expected that the local minimum is "far away," so larger adjustments are made. As the slope lessens, smaller adjustments are made to avoid badly overshooting the local minimum. In terms of multi-vector calculus, this is a gradient function of many variables:

$$-\nabla C(w)$$

The value of $-\nabla C$ is simply a vector of the same number of variables as w, indicating which direction is "down" for this multivariable cost function. For each value in $-\nabla C$, the sign of each scalar tells the network which "direction" the value needs to be nudged, and the magnitude of each scalar can be used to infer which values are most "important" to change.

Gradient descent involves computing the gradient function, taking a small step in the "downhill" direction of the gradient (with the magnitude of the step depending on the magnitude of the gradient), and then repeating until a local minimum has been found within a threshold.

While finding a local minimum is relatively straightforward once the value of $-\nabla C$, finding an absolutely minimum is many times harder, particularly when the function has thousands or millions of variables. Thus, common neural networks consider a local minimum to be "good enough," with adjustments possible if the local minimum yields unacceptable results. Because the cost function is ultimately an average "error" value over the entire training set, minimizing the cost function yields a (locally) lowest average error.

In many cases, the most difficult part of gradient descent is computing the value of $-\nabla C$. As mentioned above, computing this symbolically or exactly would be prohibitively difficult. A more practical method is to use "back-propagation" to numerically approximate a value for $-\nabla C$. Back-propagation may include, for example, examining an individual perceptron at the output layer, and determining an average cost value for that perceptron across the whole training set. Taking the "4" perceptron as an example, if the input image is a 4, it is desirable for the perceptron to have a value of 1.00, and for any input images that are not a 4, it is desirable to have a value of 0.00. Thus, an overall or average desired adjustment for the "4" perceptron can be computed.

However, the perceptron value is not hard-coded, but rather depends on the activation values received from the previous layer. The parameters of the perceptron itself (weights and bias) can be adjusted, but it may also be desirable to receive different activation values from the previous layer. For example, where larger activation values are received from the previous layer, the weight is multiplied by a larger value, and thus has a larger effect on the final activation value of the perceptron. The perceptron essentially "wishes" that certain activations from the previous layer were larger or smaller. Those "wishes" can be back-propagated to the previous-layer neurons.

At the next layer, the neuron takes into account the "wishes" from the next downstream layer in determining its own "preferred" activation value. Again, at this layer, the activation values are not hard-coded. Each neuron can adjust its own weights and biases, and then back-propagate changes to the activation values that it "wishes" would occur. The back-propagation continues, layer by layer, until the weights and biases of the first hidden layer are set. This layer cannot back-propagate desired changes to the input layer, because the input layer receives activation values directly from the input image.

After a round of "nudging," the network may receive another round of training with the same or a different training data set, and the process is repeated until a local and/or global minimum value is found for the cost function.

FIG. 11 is a flowchart of a method 1100. Method 1100 may be used to train a neural network, such as neural network 1000 of FIG. 10.

In block 1104, the network is initialized. Initially, neural network 1000 includes some number of neurons. Each neuron includes a transfer function or kernel. In the case of a neural network, each neuron includes parameters such as the weighted sum of values of each neuron from the previous layer, plus a bias. The final value of the neuron may be normalized to a value between 0 and 1, using a function such as the sigmoid or ReLU. Because the untrained neural network knows nothing about its problem space, and because it would be very difficult to manually program the neural network to perform the desired function, the parameters for each neuron may initially be set to just some random value. For example, the values may be selected using a pseudorandom number generator of a CPU, and then assigned to each neuron.

In block 1108, the neural network is provided a training set. In some cases, the training set may be divided up into smaller groups. For example, if the training set has 100,000 objects, this may be divided into 1,000 groups, each having 100 objects. These groups can then be used to incrementally train the neural network. In block 1108, the initial training set is provided to the neural network. Alternatively, the full training set could be used in each iteration.

In block 1112, the training data are propagated through the neural network. Because the initial values are random, and are therefore essentially garbage, it is expected that the output will also be a garbage value. In other words, if neural network 1000 of FIG. 10 has not been trained, when input image 1004 is fed into the neural network, it is not expected with the first training set that output layer 1020 will light up perceptron 4. Rather, the perceptrons may have values that are all over the map, with no clear winner, and with very little relation to the number 4.

In block 1116, a cost function is computed as described above. For example, in neural network 1000, it is desired for perceptron 4 to have a value of 1.00, and for each other perceptron to have a value of 0.00. The difference between the desired value and the actual output value is computed and squared. Individual cost functions can be computed for each training input, and the total cost function for the network can be computed as an average of the individual cost functions.

In block 1120, the network may then compute a negative gradient of this cost function to seek a local minimum value of the cost function, or in other words, the error. For example, the system may use back-propagation to seek a negative gradient numerically. After computing the negative gradient, the network may adjust parameters (weights and biases) by some amount in the "downward" direction of the negative gradient.

After computing the negative gradient, in decision block 1124, the system determines whether it has reached a local minimum (e.g., whether the gradient has reached 0 within the threshold). If the local minimum has not been reached, then the neural network has not been adequately trained, and control returns to block 1108 with a new training set. The training sequence continues until, in block 1124, a local minimum has been reached.

Now that a local minimum has been reached and the corrections have been back-propagated, in block 1132, the neural network is ready.

FIG. 12 is a flowchart of a method 1200. Method 1200 illustrates a method of using a neural network, such as network 1000 of FIG. 10, to classify an object.

In block 1204, the network extracts the activation values from the input data. For example, in the example of FIG. 10, each pixel in input image 1004 is assigned as an activation value to a neuron 1008 in input layer 1012.

In block 1208, the network propagates the activation values from the current layer to the next layer in the neural network. For example, after activation values have been extracted from the input image, those values may be propagated to the first hidden layer of the network.

In block 1212, for each neuron in the current layer, the neuron computes a sum of weighted and biased activation values received from each neuron in the previous layer. For example, in the illustration of FIG. 10, neuron 0 of the first hidden layer is connected to each neuron in input layer 1012. A sum of weighted values is computed from those activation values, and a bias is applied.

In block 1216, for each neuron in the current layer, the network normalizes the activation values by applying a function such as sigmoid, ReLU, or some other function.

In decision block 1220, the network determines whether it has reached the last layer in the network. If this is not the last layer, then control passes back to block 1208, where the activation values in this layer are propagated to the next layer.

Returning to decision block 1220, If the network is at the last layer, then the neurons in this layer are perceptrons that provide final output values for the object. In terminal 1224, the perceptrons are classified and used as output values.

Figure 13:
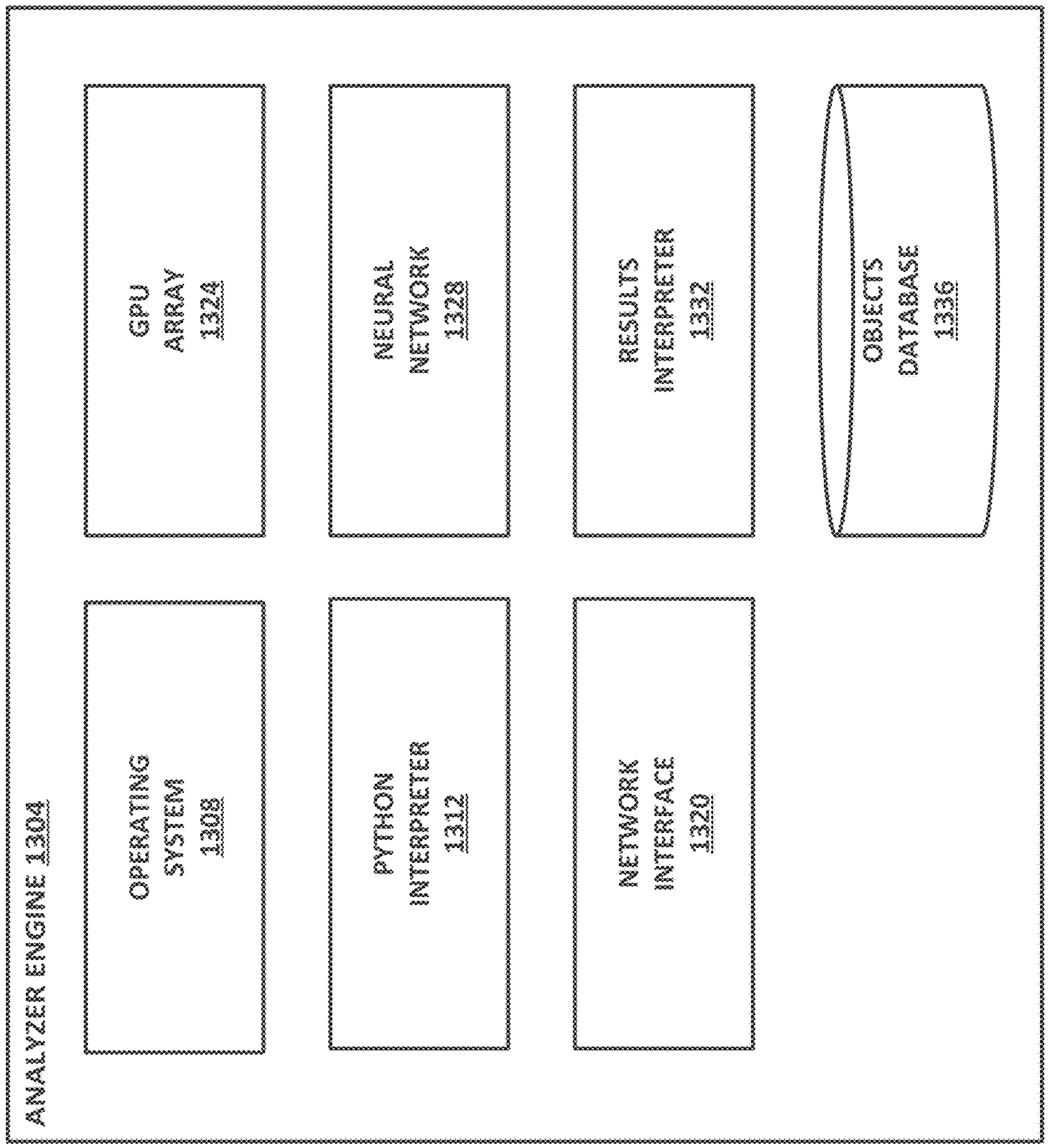
FIG. 13 is a block diagram illustrating selected elements of an analyzer engine.

FIG. 13 is a block diagram illustrating selected elements of an analyzer engine 1304. Analyzer engine 1304 may be configured to provide analysis services, such as via a neural network. FIG. 13 illustrates a platform for providing analysis services. Analysis, such as neural analysis and other ML models, may be used in some embodiments to provide one or more features of the present disclosure.

Note that analyzer engine 1304 is illustrated here as a single modular object, but in some cases, different aspects of analyzer engine 1304 could be provided by separate hardware, or by separate guests (e.g., virtual machines or containers) on a hardware system.

Analyzer engine 1304 includes an operating system 1308. Commonly, operating system 1308 is a Linux operating system, although other operating systems, such as Microsoft Windows, Mac OS X, or similar could be used. Analyzer engine 1304 also includes a Python interpreter 1312, which can be used to run Python programs. A Python module known as Numerical Python (NumPy) is often used for neural network analysis. Although this is a popular choice, other non-Python or non-NumPy-based systems could also be used. For example, the neural network could be implemented in Matrix Laboratory (MATLAB), C, C++, Fortran, R, or some other compiled or interpreted computer language.

GPU array 1324 may include an array of graphics processing units that may be used to carry out the neural network functions of neural network 1328. Note that GPU arrays are a popular choice for this kind of processing, but neural networks can also be implemented in CPUs, or in ASICs or FPGAs that are specially designed to implement the neural network.

Neural network 1328 includes the actual code for carrying out the neural network, and as mentioned above, is commonly programmed in Python.

Results interpreter 1332 may include logic separate from the neural network functions that can be used to operate on the outputs of the neural network to assign the object for particular classification, perform additional analysis, and/or provide a recommended remedial action.

Objects database 1336 may include a database of known malware objects and their classifications. Neural network 1328 may initially be trained on objects within objects database 1336, and as new objects are identified, objects database 1336 may be updated with the results of additional neural network analysis.

Once final results have been obtained, the results may be sent to an appropriate destination via network interface 1320.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computing apparatus, comprising:

a hardware platform comprising a processor circuit and a memory; and instructions encoded within the memory to:

receive a human-generated comment including a user sentiment about a uniform resource locator (URL);

analyze the human-generated comment with a trained machine learning (ML) model to determine the user sentiment, wherein the user sentiment relates to whether the URL hosts malicious or phishing content;

after analyzing the human-generated comment, assign a predicted reputation to the URL based on the analysis by the machine learning model;

compute a security reputation for the URL, wherein the security reputation accounts for a probability that the URL hosts malicious or phishing content and is based on a feature vector including a plurality of features, wherein the feature vector includes the predicted reputation as one of the plurality of features; and update a cloud-based URL reputation service with the computed security reputation.

2. The computing apparatus of claim 1, wherein the ML model is a convolutional neural network.

3. The computing apparatus of claim 1, wherein the instructions are further to vectorize the human-generated comment by applying a term frequency-inverse document frequency (TF-IDF) vectorizer.

4. The computing apparatus of claim 3, wherein vectorizing the human-generated comment comprises parsing the human-generated comment into equal length vectors.

5. The computing apparatus of claim 1, wherein the instructions are further to assign a sentiment strength to the human-generated comment.

6. The computing apparatus of claim 5, wherein the instructions are further to provide the sentiment strength as a feature input to computing the security reputation for the URL.

7. The computing apparatus of claim 5, wherein the instructions are to preserve capitalization and punctuation of the human-generated comment.

8. The computing apparatus of claim 1, wherein the instructions are further to assign a collective sentiment score to a plurality of human-generated comments related to the URL.

9. The computing apparatus of claim 8, wherein the instructions are to ignore the user sentiment if the user sentiment deviates from the collective sentiment score beyond a threshold.

10. The computing apparatus of claim 9, wherein the threshold is a selected number of standard deviations.

11. A computer-implemented method of assigning a reputation to a uniform resource locator (URL), comprising:

receiving a human-generated comment including a user sentiment about a uniform resource locator (URL);

analyzing the human-generated comment with a trained machine learning (ML) model to determine the user sentiment, wherein the user sentiment relates to whether the URL hosts malicious or phishing content;

after analyzing the human-generated comment, assign a predicted reputation to the URL based on the analysis by the machine learning model;

computing a security reputation for the URL, wherein the security reputation accounts for a probability that the URL hosts malicious or phishing content and is based on a feature vector including a plurality of features, wherein the feature vector includes the predicted reputation as one of the plurality of features; and updating a cloud-based URL reputation service with the computed security reputation.

12. The method of claim 11, further comprising vectorizing the human-generated comment by applying a term frequency-inverse document frequency (TF-IDF) vectorizer.

13. The method of claim 11, further comprising assigning a sentiment strength to the human-generated comment.

14. The method of claim 13, further comprising providing the sentiment strength as a feature input to computing the security reputation for the URL.

15. The method of claim 11, further comprising assigning a collective sentiment score to a plurality of human-generated comments related to the URL.

16. The method of claim 15, further comprising ignoring the user sentiment if the user sentiment deviates from the collective sentiment score beyond a threshold.

17. The method of claim 16, wherein the threshold is a selected number of standard deviations.

18. One or more tangible, non-transitory computer-readable storage media having stored thereon executable instructions that, when executed by at least one processor, cause a computer system to:

receive a human-generated comment including a user sentiment about a uniform resource locator (URL);

analyze the human-generated comment with a trained machine learning (ML) model to determine the user sentiment, wherein the user sentiment relates to whether the URL hosts malicious or phishing content;

after analyzing the human-generated comment, assign a predicted reputation to the URL based on the analysis by the machine learning model;

compute a security reputation for the URL, wherein the security reputation accounts for a probability that the URL hosts malicious or phishing content and is based on a feature vector including a plurality of features, wherein the feature vector includes the predicted reputation as one of the plurality of features; and update a cloud-based URL reputation service with the computed security reputation.

19. The one or more tangible, non-transitory computer-readable storage media of claim 18, wherein the executable instructions are further to vectorize the human-generated comment by applying a term frequency-inverse document frequency (TF-IDF) vectorizer.

* * * * *